United States Patent [19]
Norita et al.

[11] Patent Number: 6,049,385
[45] Date of Patent: Apr. 11, 2000

[54] THREE DIMENSIONAL MEASUREMENT SYSTEM AND PICKUP APPARATUS

[75] Inventors: Toshio Norita, Osaka; Hiroshi Uchino, Otokuni-Gun; Takuto Joko, Nacaokakyo; Eiichi Ide, Itami, all of Japan

[73] Assignee: Minolta Co., Ltd., Osaka, Japan

[21] Appl. No.: 08/867,877

[22] Filed: Jun. 4, 1997

[30] Foreign Application Priority Data

| Jun. 5, 1996 | [JP] | Japan | 8-142827 |
| Jun. 5, 1996 | [JP] | Japan | 8-142828 |
| Jun. 5, 1996 | [JP] | Japan | 8-142829 |
| Jun. 5, 1996 | [JP] | Japan | 8-142830 |
| Jun. 5, 1996 | [JP] | Japan | 8-142831 |

[51] Int. Cl.$^7$ ................................................. G01B 11/24
[52] U.S. Cl. ........................................ 356/376; 250/559.22
[58] Field of Search ................................. 356/375, 376; 364/559; 250/234–236, 559.22, 559.19

[56] References Cited

U.S. PATENT DOCUMENTS

| 4,758,093 | 7/1988 | Stern et al. | 356/376 |
| 4,794,262 | 12/1988 | Sato et al. | 250/560 |
| 4,882,490 | 11/1989 | Takasaki et al. | 250/236 |
| 4,939,379 | 7/1990 | Horn | 250/560 |
| 4,961,155 | 10/1990 | Ozeki et al. | 356/375 |
| 5,024,529 | 6/1991 | Svetkoff et al. | 356/376 |
| 5,102,223 | 4/1992 | Uesugi et al. | 356/376 |
| 5,175,595 | 12/1992 | Fukase | 356/387 |
| 5,362,958 | 11/1994 | Ano | 250/208.1 |

FOREIGN PATENT DOCUMENTS

| 4-83133 | 3/1992 | Japan. |
| 5-196432 | 8/1993 | Japan. |
| 7-174536 | 7/1995 | Japan. |
| 7-174537 | 7/1995 | Japan. |

*Primary Examiner*—Hoa Q. Pham
*Attorney, Agent, or Firm*—McDermott, Will & Emery

[57] ABSTRACT

In a three dimensional measurement system, a three dimensional pickup apparatus picks up an object repeatedly to generate image information including a shape of the object, and an information processor receives image frame signals and digital signals from the pickup apparatus to process the image information. Image information is sent as image frame signals through a first output terminal, and digital signals are sent through a second output terminal in correspondence to output of the image information through the first output terminal. In the information processor, an input controller receives the digital signals from the first output terminal and receives the image frame signals suitable for transmission of moving images in correspondence to the received digital signals from the second output terminal. For example, the pickup conditions for a next period are set based on the pickup information obtained in a current period. For example, a distance sensor is provided further to adjust the pickup conditions in various ways in continuous pickup mode.

12 Claims, 17 Drawing Sheets

THREE DIMENSIONAL MEASUREMENT SYSTEM AND PICKUP APPARATUS

BACKGROUND OF THE INVENTION

1. Field of the Invention

The present invention relates to a system and a method for three dimensional measurement wherein a detection light such as a slit light is cast onto an object to measure a shape of the object.

2. Description of Prior Art

A non-contact typethree dimensional measurement apparatus (three dimensional camera) called as a range finder can measure a shape of a matter at a faster speed than a contact type apparatus. Therefore, it is used as an apparatus for inputting an image for a computer graphic (CD) system or a computer aided design (CAD) system, measurement of a material, optical recognition of a robot and the like.

Slit light projection is known as a measurement technique suitable for a range finder, wherein an object is scanned optically and a distance image (three dimensional image) is calculated by using the principle of trigonometry. It is one of active measurement techniques which cast a detection light to pickup an image of an object. A distance image is a set of pixels representing three dimensional positions at a plurality of positions on the object. An operation to determine a distance image from pickup information is performed by a range finder itself or by an external information processor such as a computer system. In slit light projection, a linear slit light is used as the detection light, but other techniques using a spot light, a step light, a density pattern light or the like are also known.

In general, measurement information obtained by a range finder is sent to an on-line information processor or through a storage medium to an off-line information processor.

Then, it is subjected to predetermined processing such as analysis, edition or storage of the information.

In a prior art range finder, one measurement is performed in response to a command received from the external or to a switch operation by a user. However, if a range finder performs measurements periodically, a range of uses of is three dimensional measurement will be expanded. For example, it can be used more practically for inspecting a shape of an object in a production line in a factory, for optical recognition of a moving robot, for a watch system for security guard, or the like. When distance images obtained by periodic three dimensional measurements in a time series are compared, a move of an object back and forth or a change in shape can be recognized easily.

However, prior art range finders have problems on repeated pickup. For example, in a system where an external information processor gives a start command to a range finder, the external information processor has to send a start command for each of periodic measurements. Then, communication sequence becomes complicated. Further, in a conventional three dimensional measurement system, except in a special system used only for displaying a distance image, an information processor performs data processing such as data analysis and storage. Then, if measurements are performed periodically, the information processor has to recognize that the latest measurement information is sent from the range finder and has to store it for data processing.

A prior art portable range finder which can selects a pickup distance has a sensor for measuring a distance to an object. The measured distance is used for autofocusing and for setting a range of pickup angle. The distance measurement is performed before optical scanning for each pickup (or measurement).

In the range finder, active distance measurement can be performed precisely with use of an optical system for the measurement. Because it has a scanner, it is easy to expand a viewing angle for distance measurement by projecting a light in a plurality of directions. However, if active distance measurement is compared with passive distance measurement, a distance range which can be measured is narrower for the active distance measurement. Then, it is not sure a projection in a direction can catch the object. Then, when the direction of the projection has to be changed, the measurement time becomes longer.

Because the prior art range finder performs the distance measurement for each measurement, the measurement time by using the above-mentioned precise optical measurement is long, especially for the repeated pickups.

In a prior art range finder, the movement of the lens has to be forbidden during a pickup in order to prevent a change in the pickup conditions. Then, if a distance to an object is changed largely during a measurement, for example, if the object moves largely during a measurement, the distance measurement cannot follow the movement of the object, and a distance measurement controller loses sight of the object. If the object is lost, the measurement conditions such as focusing and light intensity cannot be set correctly, and the reliability of the measurement is worsened. Further, if the measurement is performed in a defocused state, the precision of the obtained distance image is lowered. Further, if the object is lost, the distance measurement may take a longer time to catch the object.

SUMMARY OF THE INVENTION

An object of the present invention is to provide a three dimensional measurement system which measures distance images periodically and processes data thereof easily and surely.

Another object of the present invention is to provide a three dimensional measurement system which measures distance images periodically and processes data thereof in a shorter time while keeping precision of the measurement conditions.

A further object of the present invention is to provide a three dimensional measurement system which measures distance images periodically and processes data thereof wherein measurement conditions can be set appropriately for various uses.

A still further object of the present invention is to provide a three dimensional measurement system which measures distance images periodically and processes data thereof wherein the measurement conditions are set reliably high.

In one aspect of the invention, a three dimensional measurement system comprises a three dimensional pickup apparatus which picks up an object to generate image information including a shape of the object, and an information processor which receives image frame signals and digital signals from the pickup apparatus to process the image information. The pickup apparatus comprises an imaging controller for performing pickup operation repeatedly. It sends image information obtained by the imaging controller as image frame signals through a first output terminal, and sends digital signals through a second output terminal in correspondence to output of the image information through the first output terminal. The information processor comprises an input controller which receives the digital signals from the second output terminal and receives the image frame signals in correspondence to the received digital signals from the second output terminal. When measurement is performed periodically, because the measured information is image information, image frame signals which have been used for transmission of moving images are suitable. Such a standard image signal format is advantageous especially when measurement result (distance image) is displayed with a display device in real time for each measurement.

In a second aspect of the invention, a three dimensional pickup apparatus comprises a pick-up device which picks up an object, a condition setter for setting pickup conditions of the pick-up device, an imaging controller for performing pickup operation repeatedly in the pickup conditions. The condition setter sets the pickup conditions for a next period based on pickup information obtained in pickup in a current period.

In a third aspect of the invention, a three dimensional pickup apparatus comprises a distance sensor which measures the distance to the object. That is, distance measurement with the distance sensor is used besides distance measurement with light projection using the optical system for measurement. A pick-up device picks up an object, while a condition setter sets pickup conditions of the pick-up device according to a distance to the object. A pickup controller controls the pick-up device to pickup the object in the conditions set by the condition setter. When the distance measured by the distance sensor is changed after the condition setter sets the pickup conditions, the condition setter sets pickup conditions again according to the distance measured by the distance sensor. By using the optical system for measurement, the precision of the measurement is secured, while by using the distance sensor, continuous measurements are performed. The distance sensor can measure the distance in a wider range than the measurement with light projection. By selecting a projection direction with reference to the measured value by the distance sensor, the distance measurement with the optical system for measurement can be performed efficiently.

In a fourth aspect of the invention, a three dimensional pickup apparatus comprises a pick-up device which picks up an object, a condition setter for setting pickup conditions for setting pickup conditions of the pick-up device, an imaging controller for performing pickup operation repeatedly in correspondence to a start signal. In the periodic measurement, there are a first case where the measurement conditions have to be kept constant and a second case where measurement conditions have to adjusted for each measurement. The condition setter sets the pickup conditions in a first mode before each pickup operation so that each pickup operation is performed in pickup conditions updated before the-pickup operation, while the condition setter sets the pickup conditions in a second mode once so that each pickup operation thereafter is performed in the same pickup conditions. For example, the first case includes inspection of a product in a factory, and the second case includes optical recognition of a moving robot. If the measurement conditions are fixed, it becomes easy to handle the measurement data in time series, while if the measurement conditions are variable, appropriate measurement data can be obtained irrespective of measurement environment. The measurement environment includes a state of a measured area including distance to an object, characteristics of the object (reflectivity) and environment light. The measurement conditions includes a range of projection angle of detection light, an intensity of the detection light and focusing state.

Then, it is preferable that a user can select a mode for fixing measurement conditions and a mode for changing them. On the other hand, if the mode is limited to one of them, the cost can be decreased.

In a fifth aspect of the invention, a three dimensional pickup apparatus comprises a pick-up device which picks up an object, a condition setter for setting pickup conditions for the pick-up device, a pickup controller for performing pickup operation repeatedly in correspondence to a start signal. The condition setter sets the pickup conditions before each pickup operation so that each pickup operation is performed in pickup conditions updated before the pickup operation. Pickup information obtained in each measurement is used to set measurement conditions for a next measurement. In other words, each measurement is also used as a preliminary measurement for a next measurement. Then, a preliminary active distance measurement is not needed between measurements, and the measurement period can be shortened. Because the optical system for measurement is used for the preliminary measurement, the distance can be measured precisely. Further, because measurement information in a number of projection angles is obtained, measurement conditions can be set by using a statistical method or the like.

An advantage of the invention is that a three dimensional measurement system can perform periodic measurement without a start command and updates measurement information surely.

Another advantage of the invention is that the measurement period of a three dimensional measurement system can be shortened in continuous measurement mode.

A further advantage of the invention is that the measurement conditions of a three dimensional measurement system can be set more precisely in continuous measurement mode.

A different advantage of the invention is that the measurement conditions of a three dimensional measurement system can be set more precisely in continuous measurement mode.

A still different advantage of the invention is that the measurement conditions of a three dimensional measurement system can be set more appropriately according to uses in continuous measurement mode.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
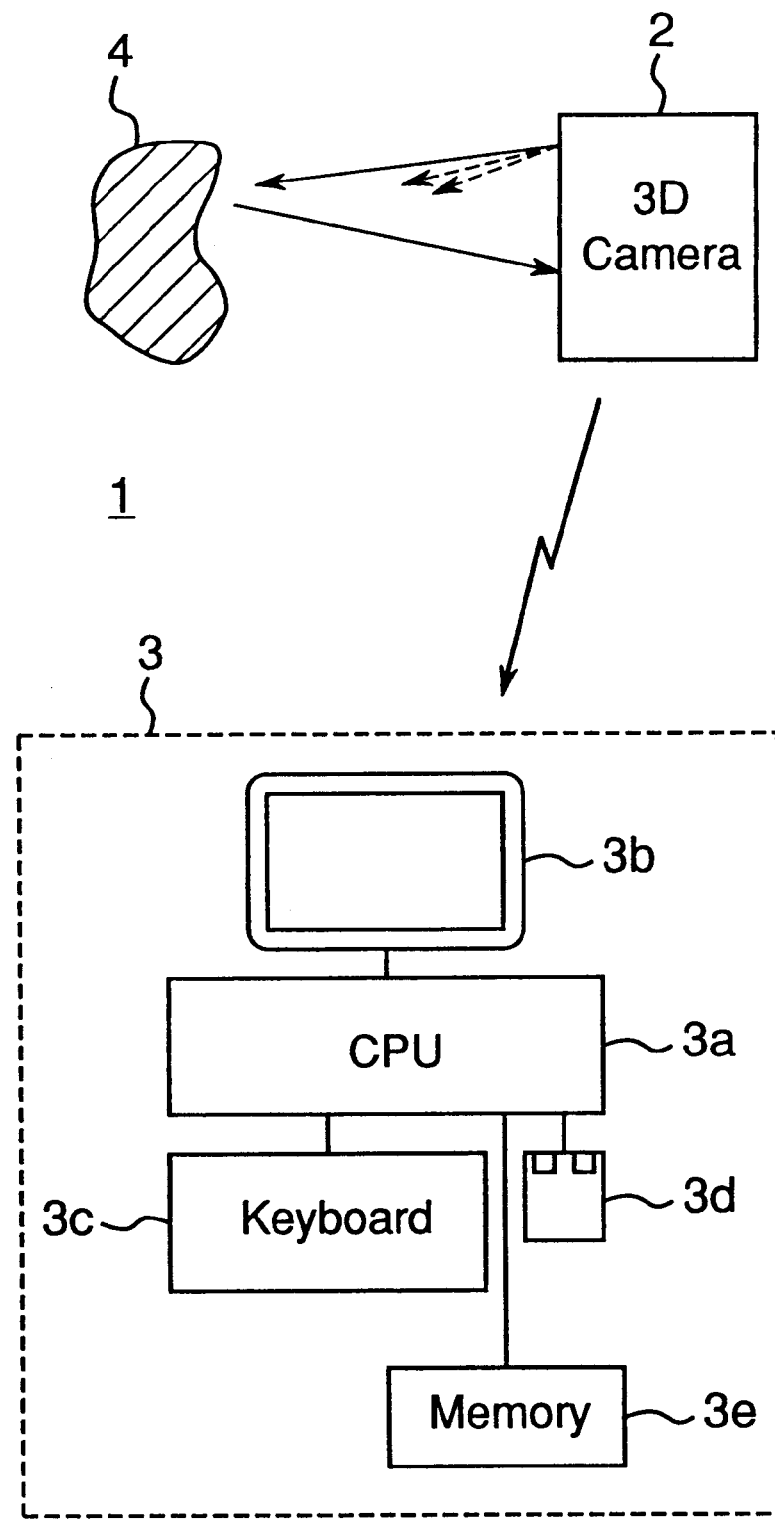
FIG. 1 is a diagram of a three dimensional measurement system of the invention.

Referring now to the drawings, wherein like reference characters designate like or corresponding parts throughout the views, FIG. 1 shows a diagram of a measurement system 1 according to the invention comprising a three dimensional camera (range finder) 2 for performing stereo measurement with slit light projection and a host computer 3 for processing data output by the three dimensional camera 2.

The three dimensional camera 2 outputs measurement data (a distance image) specifying three dimensional positions of sampling points on an object 4, a two dimensional image on color information of the object 4 and data necessary for calibration. Operation to determine coordinates of the sampling points by using trigonometry is performed by the host computer 3.

The host computer 3 is a computer system including a central processing unit (CPU) 3a, a display 3b, a keyboard 3c, a mouse 3d, and a memory 3e. The CPU 3a stores a program for processing measurement data. The host computer 3 is online to the three dimensional camera 2 to sent and receive the data. The memory 3e stores a program for measurement (refer to FIG. 18).

Figure 2A:
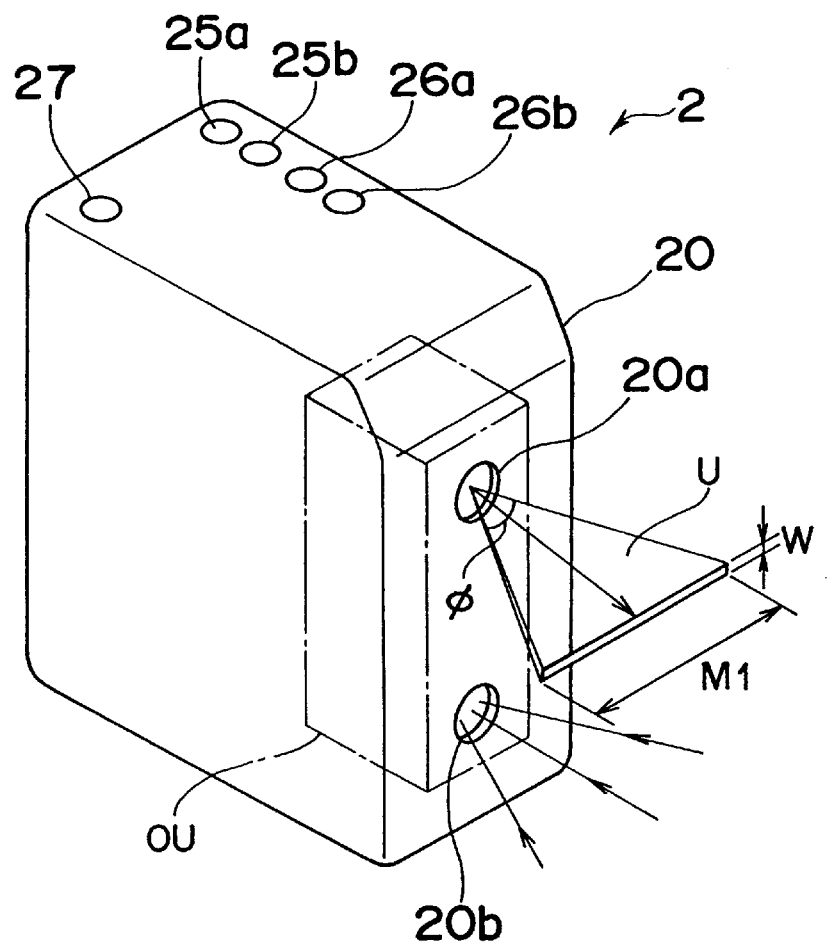
FIG. 2A is a perspective view of a three dimensional camera.

FIG. 2A is a perspective view of the three dimensional camera 2. A projection window 20a and a light-receiving window 20b are provided at a front of a housing 20. The projection window 20a is located above the light-receiving window 20b. A slit light U (a laser beam of a linear band of a predetermined width W and a length M1) cast by an internal optical unit OU (not shown) propagates through the projection window 20a to an object to be measured. Radiation angle φ along the length direction of the slit light U is fixed. A part of the slit light U reflected by a surface of the object enters through the light-receiving window 20b to the optical is unit OU. The optical unit OU has a two-axis control mechanism to adjust relative positions of the projection axis and the light-receiving axis.

Figure 2B:
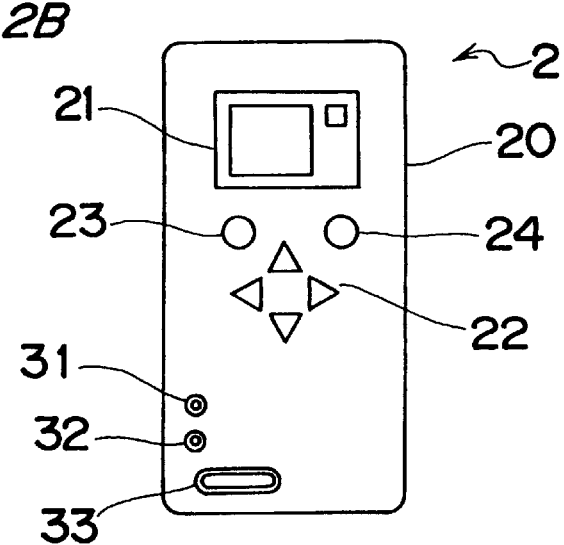
FIG. 2B is a rear view thereof.

At the top of the housing 20 are provided buttons 25a and 25b for zooming, buttons 26a and 26b for manual focusing, and a button 27 for start/stop. Further as shown in FIG. 2B, at the rear side of the housing 20 are provided a liquid crystal display 21, cursor buttons 22, a button 23 for selection, a button 24 for canceling, analog output terminals 31 and 32 and a digital output terminal 33. A distance image is output through the analog terminal 31 as measurement data, while a two dimensional image DM is output through the other analog terminal 32. The digital terminal 33 is for example an RS 232-C terminal and it is used to output pickup condition data DS. The liquid crystal display 21 is used as a means for displaying images for inputting instructions and as an electronic finder. A user can set a pickup mode by the buttons 22–24 at the rear side.

When measurement is performed periodically, because the measurement information is image information, image frame signals which have been used for transmission of moving images are suitable. If a standard image signal format such as NTSC format as a representative is adopted, as explained above, a general circuit for image signal processing can be used and the apparatus can be manufactured at a lower cost. Such a standard image signal format is advantageous especially when measurement result (distance image) is displayed with a display device in real time for each measurement.

Figure 3:
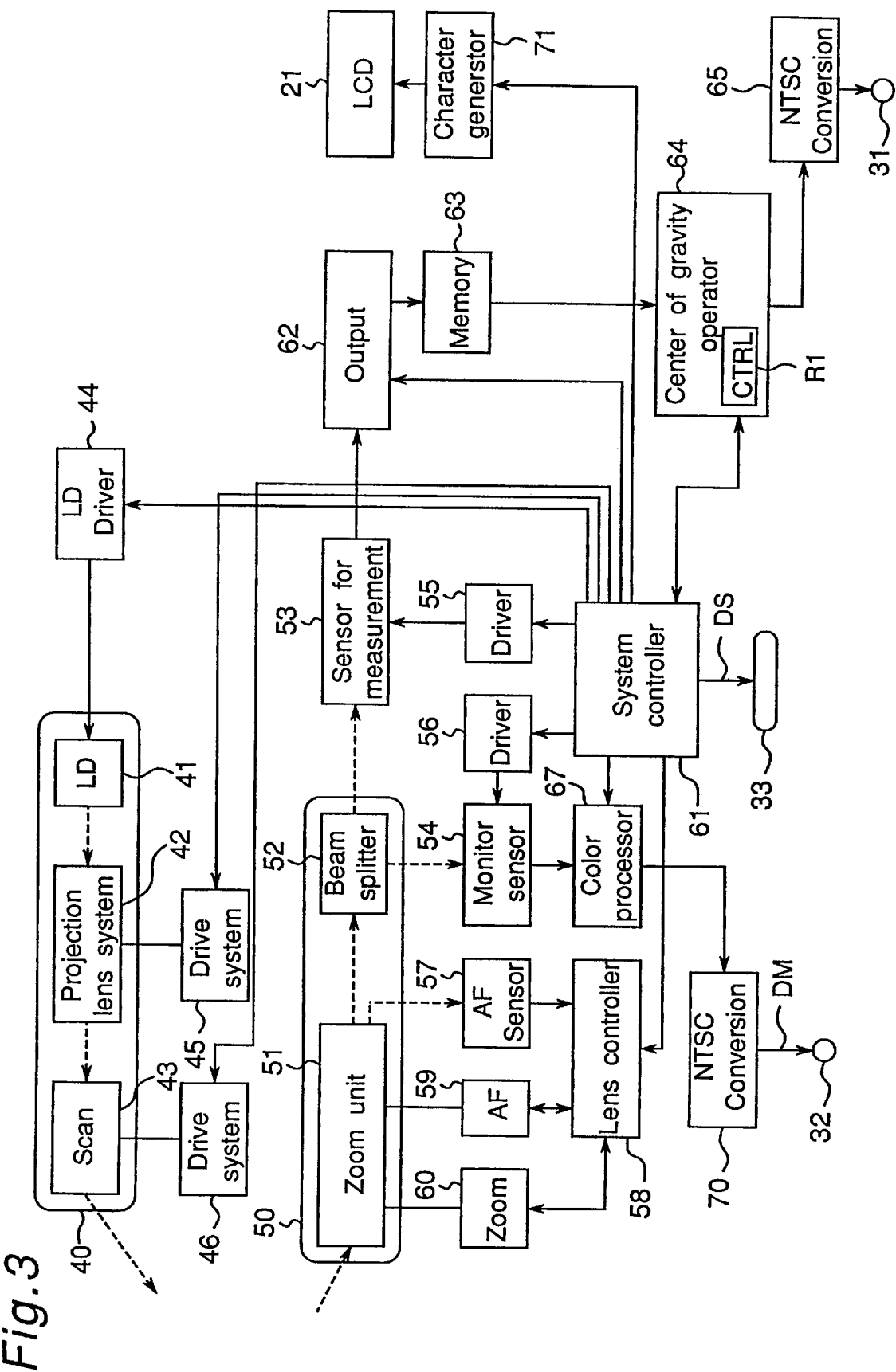
FIG. 3 is a block diagram for illustrating functions of the three dimensional camera.

FIG. 3 illustrates functions of the three dimensional camera 2 wherein solid lines represent a flow of electric signals and dashed lines represent a flow of light. The three dimensional camera 2 has the optical unit "OU" comprising two optical systems 40 and 50 at the projection side and at the light-receiving side. In the optical system 40 at the projection side, a laser beam of wavelength 670 nm emitted by a laser diode (LD) 41 passes through a projection lens system 42 to generate the slit light U. The slit light "U" is inclined by a galvano-mirror (scan device) 43. A system controller 61 controls a driver 44 for the laser diode 41, a drive system 42 for the projection lens system and another drive system 43 for the galvano-mirror.

In the optical system 50 at the light-receiving side, a light collected by a zoom unit 51 is split by a beam splitter 52. A light in a resonance wavelength band of the laser diode 41 enters to a sensor 53 for distance measurement, while a light in a visible light range enters to a monitor color sensor 54. The two sensors 53 and 54 are charge coupled device (CCD) area sensors. The zoom unit SO is an internal focus type unit, and a part of the incident light is used for autofocusing (AF) The autofocusing mechanism is a passive mechanism adopted by single-lens reflex cameras, and it includes an AF sensor 57, a lens controller 58 and a focussing drive system 59. A zoom drive system 60 is provided for electrical zooming. Distance measurement in a passive method by using the AF sensor 57 is more advantageous than that in an active method in that a distance range to be measured is wide and that measurements can be repeated in a shorter period. However, the precision (resolution) of the passive method is not sufficient.

Pickup information obtained with the sensor 53 is transferred to an output processor 62 in synchronization with clock signals from the driver 55. The output processor 62 generates slit data in correspondence to each pixel in the sensor 53 to be stored in a memory device 63. A center-of-gravity operator 64 generates a distance image of high resolution based on the slit data. The distance image is sent through an NTSC conversion circuit 65 as on-line measurement data in a format of frame synchronization image signals. The operator 64 has a control (CTRL) register R1 for storing bit data (GCALC) for control by the system controller 61.

On the other hand, pickup information obtained with the color sensor 54 is transferred to a color processor 67 in synchronization with clock signals from the driver 56. The color processor 67 generates pickup information (two dimensional image DM) subjected to color processing and sent through an NTSC conversion circuit 70 and the analog terminal 32 as online data. The two dimensional image DM is a color image having the same image angle as the distance image obtained with the sensor 53, and it is used by the host computer 3 in the application processing as reference information. The system controller 61 instructs a character generator 71 for displaying characters and signs in correspondence to an operation state in the liquid crystal display 21.

Figure 4:
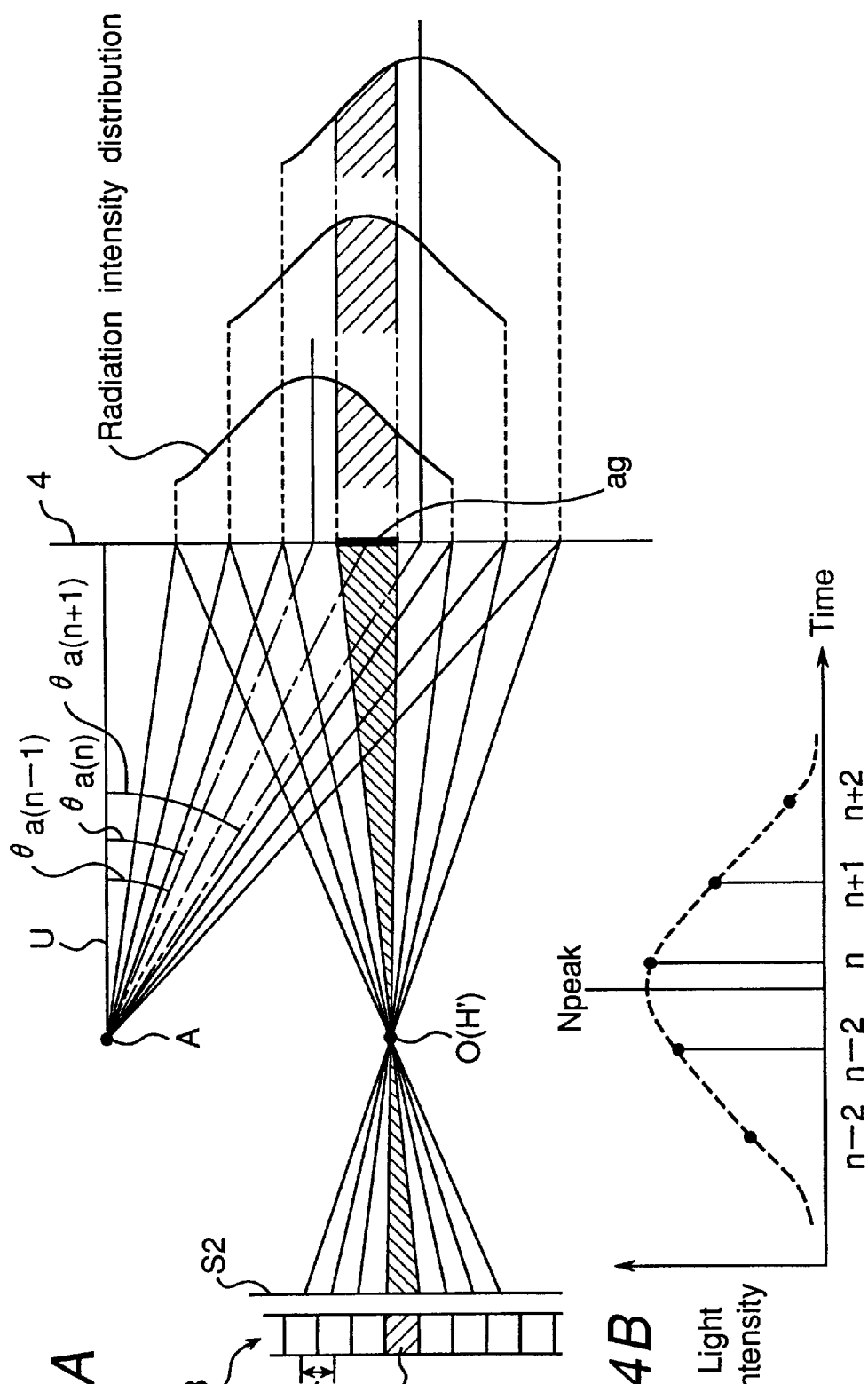
FIG. 4A is a diagram for illustrating a principle of calculation of three-dimensional positions in the measurement system.
FIG. 4B is a graph of the optical intensity plotted against time.

FIG. 4A illustrates a principle of calculation of a three-dimensional position in the measurement system. The slit light U as wide as a few pixels on a pickup plane S2 on the sensor 53 is cast on the object 4. For example, the width of the slit light U is five pixels. The slit light U is shifted for each sampling period by one pixel pitch pv from above to below on the pickup plane S2, to scan the object. The sensor 53 outputs photoelectric conversion information of one field for each sampling period.

As to a particular pixel g on the pickup plane S2, effective photosensitive data are obtained in five samplings among N samplings in the scan. By performing interpolation on the five photosensitive data, a timing is determined at which the optical axis of the slit light U passes the surface ag of the object 4 in a range observed by the particular pixel g. At the timing (or the center-of-gravity of time, $N_{peak}$), the light intensity detected by the pixel g becomes maximum. In an example shown in FIG. 4B of a graph of the optical intensity plotted against time, the light intensity becomes maximum at a time between n-th time and (n−1)-th time before the n-th one. The position (coordinates) of the object 4 is calculated according to a relation of the illumination direction of the slit light at the center-of-gravity of time, $N_{peak}$ to the incident direction of the slit light to the particular pixel. Thus, measurements can be performed at a higher resolution than that specified by the pixel pitch pv on the pickup plane. The illumination direction of the slit light is determined uniquely by the center-of-gravity of time, $N_{peak}$, if the direction along which illumination is started and the angle speed of inclination is known. The incident direction is specified by position relation of the sensor 53 to the lens receiving the light.

The light intensity at the particular pixel g depends on the reflectivity of the object 4. However, relative ratios between light intensities at the five samplings are constant irrespective of the absolute light intensity. That is, the density of the color of the object 4 does not affect the measurement precision.

When a distance image is generated from a plurality of pickup images in time series in order to improve resolution of measurement, one image is transmitted for each measurement by transmitting a distance image as measurement information, as explained above. Thus, a transmission time is shortened, and a measurement period can be avoided to become long. Then, measurement can be performed at a high speed and at a high precision.

In the system 1 of this embodiment, the center-of-gravity of time, $N_{peak}$, is calculated for each pixel g of the sensor 53 by the center-of-gravity operator 64 in the three dimensional camera 2, and the center-of-gravity of time, $N_{peak}$, of the effective number of pixels is sent to the host computer 3 in NTSC format. Thus, the amount of transmitted data becomes smaller by a large extent than a case where photosensitive data of five fields are sent to the host computer so that the center-of-gravity of time, $N_{peak}$, is calculated by the host computer 3. Thus, a time necessary for serial data transmission of analog signals can be shortened. Further, pickup conditions and apparatus conditions necessary to determine coordinates of the object from the center-of-gravity of time, $N_{peak}$, are also transmitted through the digital output terminal 33 to the host computer 3 in parallel to the transmission of the distance image.

Figure 5:
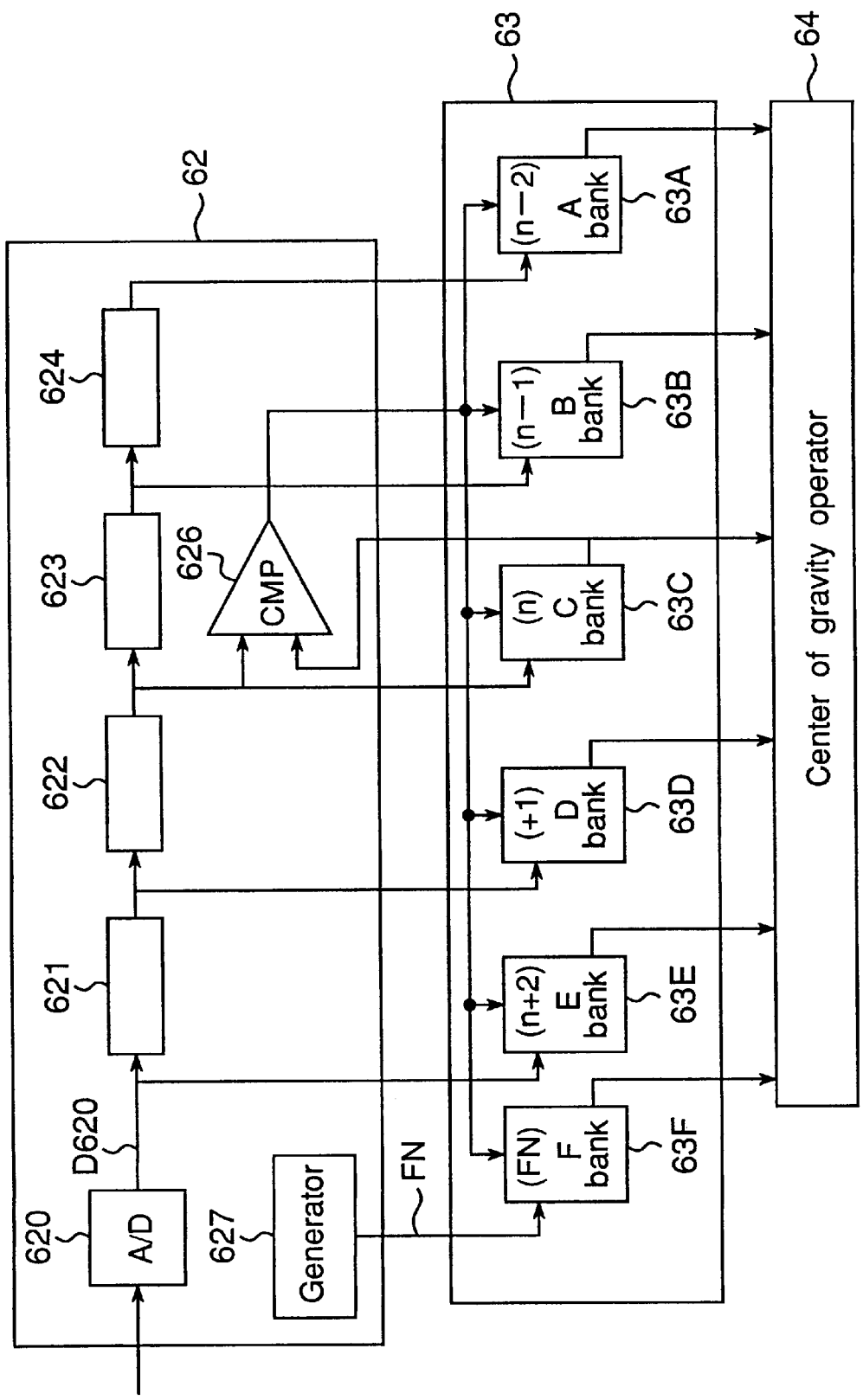
FIG. 5 is a block diagram of an output processor and memories.
Figure 6:
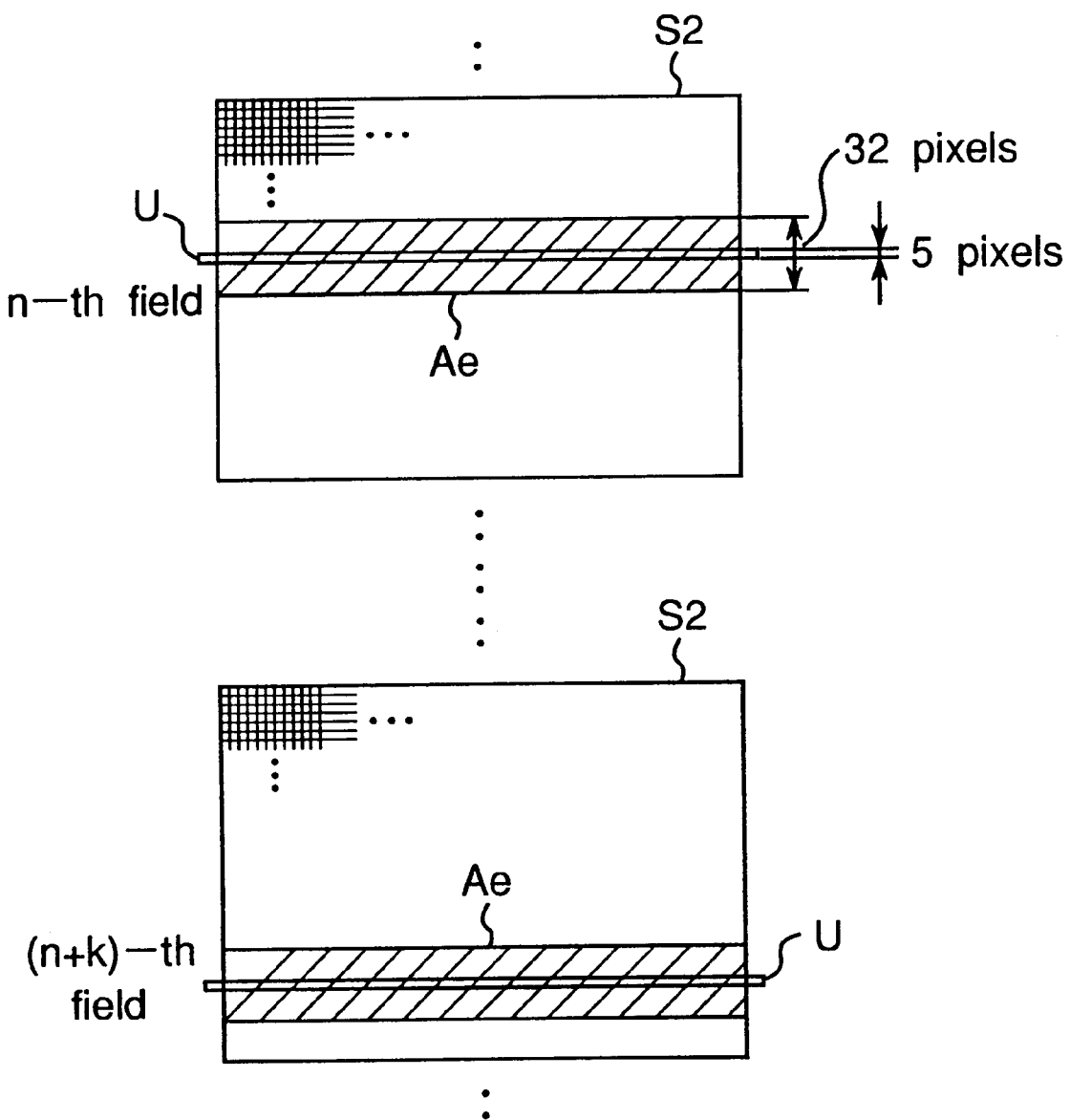
FIG. 6 is a diagram for explaining a read range of a sensor.

FIG. 5 is a block diagram of the output processor 62 and memories, and FIG. 6 is a diagram for explaining a read range of the sensor 53. The output processor 62 includes an analog-to-digital (AD) converter 620 which converts a photoelectric signal output by the sensor 53 to 8-bit photosensitive data, four delay memories 621–624 connected in series, a comparator 626, and a generator 627 representing field number (sampling number) FN. The memory device 63 includes five memory banks 63A–63E for storing receive data (slit data) of the effective five fields, a memory bank 63F for storing a field number FN at which the light intensity data becomes maximum, and a memory controller (not shown) for representing addresses of the memory banks 63A–63F. Each memory bank 63A–63E has a capacity for storing light intensity data of the same number as sampling number in a measurement, or the number of effective pixels of the sensor 53.

The light intensity data of five fields can be stored in the memory banks 63A–63E for each pixel g at the same time by delaying data by the four delay memories 621–624. A read for a field in the sensor 53 is performed only for an effective light-receiving area (belt-like image) $A_e$ in a part of the pickup plane S2. The effective light-receiving area $A_e$ is shifted by one pixel for each field accompanied by inclination of the slit light U. In this embodiment, the number of pixels is fixed at 32 along shift direction of the effective light-receiving area $A_e$. A technique to read only a part of an image on a CCD area sensor is described in Japanese Patent laid open Publication 7-174536/1995.

The AD converter 620 outputs the light intensity data D620 of 32 lines serially in the order of the pixels g. Each delay memory 621–624 is a first-in first-out (FIFO) memory having a capacity of 31 (=32−1) lines.

The light intensity data D620 of the particular pixel g received from the AD converter 620 is delayed by the delays 621 and 622 by two fields and is compared by a comparator 626 with a maximum previous data on the pixel g stored in the memory bank 63C. If the delayed data D620 is larger than the maximum previous data, the outputs of the AD converter and the delays 621–624 at the time are stored in memory banks 63E, 63D, 63C, 63B and 63A to rewrite the stored contents therein. At the same time, the field number FN in correspondence to the data D620 stored in the memory bank 63C is stored in a memory bank 63F.

That is, when the light intensity at the pixel g becomes maximum at the n-th field (n<N), the data at the (n−2)-th field is stored in the memory bank 63A, the data at the (n−1)-th field is stored in the memory bank 63B, the data at the n-th field is stored in the memory bank 63C; the data at the (n+1)-th field is stored in the memory bank 63D, the data at the (n+2)-th field is stored in the memory bank 63E, and the value "n" is stored in the memory bank 63F.

Figure 7:
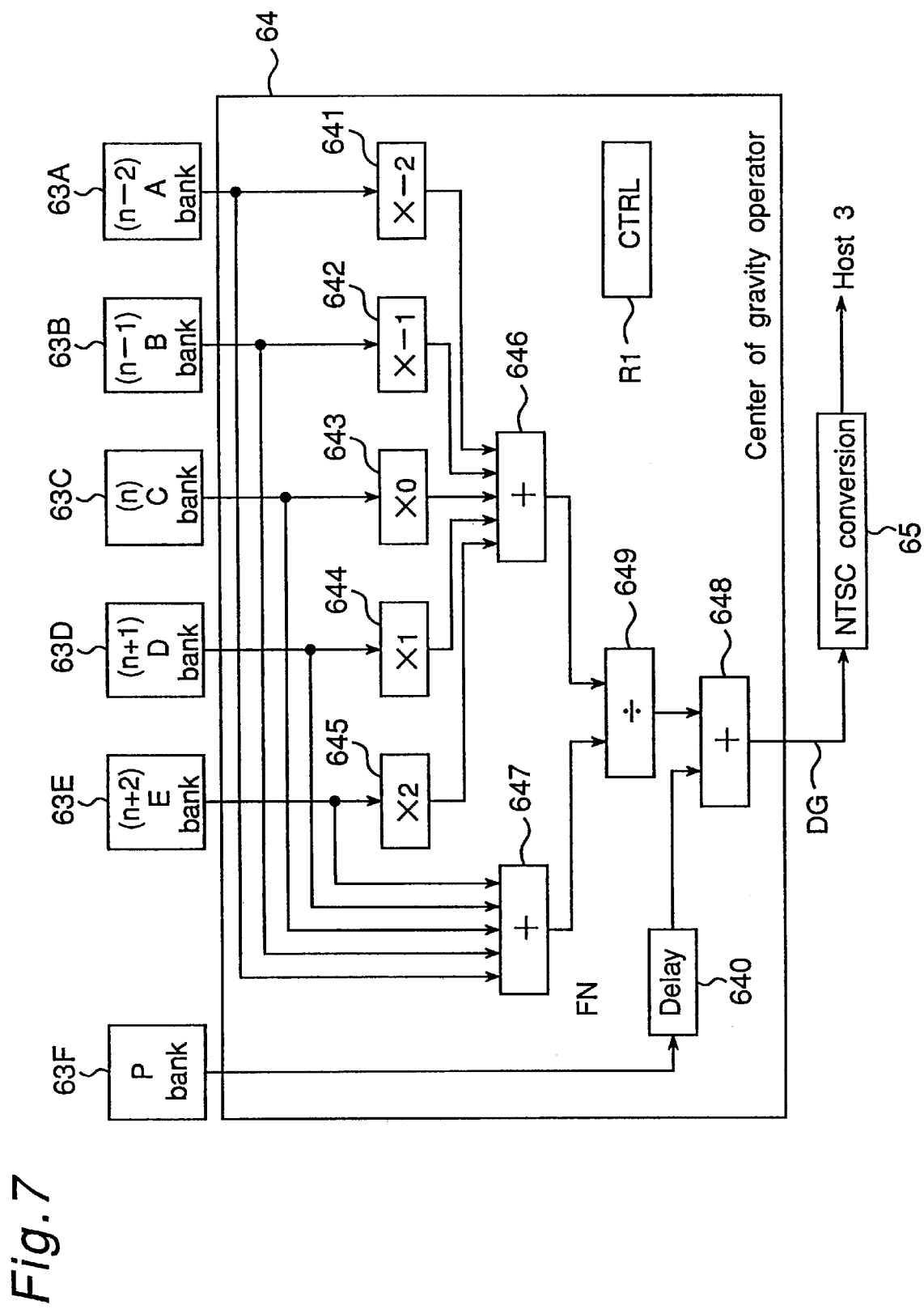
FIG. 7 is a block diagram of a center-of-gravity operator.

FIG. 7 is a block diagram of the center-of-gravity operator 64 including five multipliers 641–645, three adders 646–648, a divider 649 and a delay 640. Weights of −2, −1, 0, 1 and 2 are given to five field numbers (or sampling times) of (n−2), (n−1), n, (n+1) and (n+2) for weight average for the light intensity data from the memory banks 63A to 63E. An output of the divider 649, or a weight average, represents a time shift of n-th sampling time from the center-of-gravity of time, $N_{peak}$ (refer to FIG. 4B). The center-of-gravity of time, $N_{peak}$, is obtained by adding the time shift to the field number FN from the memory bank 63F. The delay 640 is provided to provide the field number FN to the adder 648 at the same time as the time shift, and it delays the field number FN by a time needed for the weight average.

A distance image DG as measurement information for one processing is generated by reading the data for each pixel from the memory banks 63A to 63E sequentially to send to the center-of-gravity operator 64. The distance image DG is output repeatedly for example thirty times per second.

Next, a basic measurement procedure with use of the three dimensional camera 2 is explained. In the three dimensional measurement system 1, the arrangement of the three dimensional camera 2 and an object 4 is variable. That is, a user can change a pickup distance and an angle for each pickup application. Therefore, preprocessing (pickup preparation) is performed automatically before measurement in order to set pickup conditions by checking the arrangement with respect to the object 4.

Figure 8:
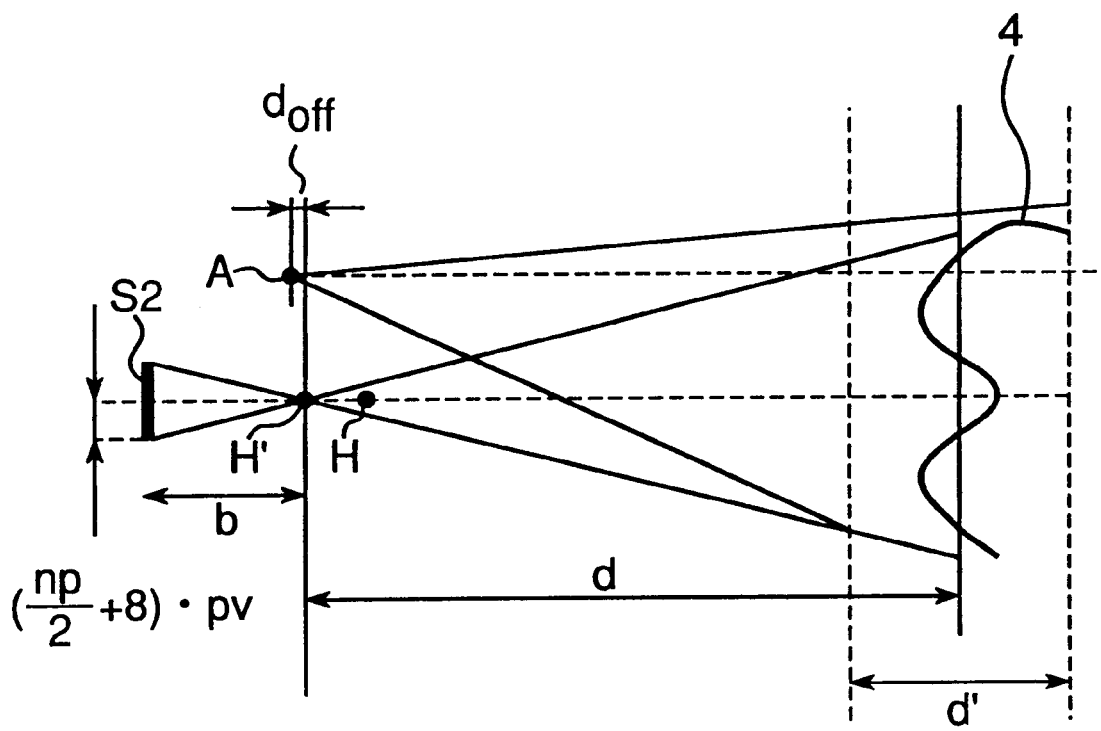
FIG. 8 is a diagram for explaining a relation between an object and points in the optical system.

FIG. 8 shows a relation between an object 4 and points in the optical system. When zooming is instructed to the camera 2 by a direct operation by a user or with a remote operation by the host computer 3, a variator of the zoom unit 51 is moved, and a focusing section thereof moves the lens for focusing. During the focusing, a rough estimate of the distance $d_o$ to the object 4 is obtained. In correspondence to the lens drive of the light-receiving system, a move distance of the variator lens at the projection side is calculated, and the lens movement is controlled according to the result of the calculation. However, zooming and autofocusing are forbidden during a pickup in order to prevent that pickup conditions are changed by the movement of the lens.

The system controller 61 reads an output (moving value Ed) of an encoder in the autofocusing drive system 59 an output (zoom setting value fp) of an encoder in the zooming drive system 60. Inside the system controller 61, distortion aberration table, main point position table and image distance table are referred, and pickup condition data in correspondence to the moving value Ed and the zoom setting value fp are sent to the host computer 2. The pickup condition data includes a main point position at the front side, and a distance of the image. Further, the system controller 61 calculates an output (laser intensity) of the laser diode 41 and inclination conditions of the slit light U (projection start angle, projection stop angle and inclination angle speed).

In the preprocessing, first, the projection angle is set so as to receive the reflected light at the center of the sensor 53 by assuming that a plane object exists at the estimated distance do to the object 4.

Next, laser intensity is calculated. By taking safety for human body into account, the laser diode 41 emits a pulse beam at the minimum intensity and an output of the sensor 53 is received. The projection angle has been set based on the distance $d_o$ to the object 4. A ratio of the received output signal to an appropriate level is calculated, and a temporary laser intensity is set. Then, the laser diode 41 emits a pulse beam again at the temporary intensity, and an output of the sensor 53 is received. The temporary setting of the laser intensity and the confirmation that the laser intensity is allowable are repeated until the output of the sensor 53 becomes within an allowable range. If the output of the sensor 53 is not sufficient even if the laser diode 41 emits a beam at the maximum intensity, exposure is controlled to lengthen the charge storage time of the sensor 53.

Next, the distance d to the object 4 is determined with trigonometry based on the projection angle of the slit light U and the position to receive the reflected light. The calculation of the inclination conditions takes into account the offset $d_{off}$ of the main point H' at the rear side of the light receiving system as a reference point for measurement the distance d relative to the start point A of projection. In order to secure the same allowable range of distance measurement at the end in the scan direction as at the center, over-scanning is performed by a predetermined quantity such as eight pixels. The projection start angle $th_1$, the projection stop angle $th_2$, and inclination angle speed ω are obtained with the following equations:

$$th_1 = \tan^{-1} \frac{\beta * pv * (np/2 + 8) + L}{d + d_{off}} * \frac{180}{\pi}, \quad (1)$$

and $$th_2 = \tan^{-1} \frac{-\beta * pv * (np/2 + 8) + L}{d + d_{off}} * \frac{180}{\pi}, \quad (2)$$

wherein β denotes pickup magnification power (=d/$f_{real}$), $f_{real}$ denotes effective focal distance, pv denotes pixel pitch, np denotes effective pixel number in the horizontal direction in the pickup plane S2 and L denotes length of base line.

$$\omega = (th_1 - th_2)/np \quad (3)$$

An actual measurement is performed in the conditions calculated above, and apparatus information and pickup conditions including the specifications of the sensor 53 are sent to the host computer 3 besides the distance image DG. However, in the continuous mode explained later, the apparatus information is sent only at the first time of the measurement. Table 1 compiles main data sent by the three dimensional camera 2 to the host computer 3.

TABLE 1

Data sent to the host

| Contents of data | | Data range |
|---|---|---|
| Measurement data | Distance image (Analog video signal) | |
| Pickup conditions | Image distance b | 0.00–300.00 |
| | Main point FH at the front side | |
| | Projection start angle $th_1$ | |
| | Inclination angle speed ω | |
| Apparatus information | Numbers of pixels (Sampling numbers, X and Y directions) | 1–0.00516 |
| | Pixel pitches pu, pv | |
| | Attitude of projection system (around X, Y and Z axes) | 0.00–±90.00 |
| | Attitude of projection system (in X, Y and Z axes) | 0.00–±300.00 |
| | Lens distortion correction factors d1 and d2 | 0.00–256.00 |
| | Sensor center pixel u0 and v0 | |
| 2-dimensional image | Analog video signals (Color) | |

Next, the operation of the measurement system 1 is explained further in detail.

The three dimensional camera 2 has one shot mode where measurement is performed only once in response to the start command and continuous mode (continuous pickup mode) where measurements are repeated after a start command until a stop command is issued.

The continuous mode has variable mode and fixed mode as autofocusing modes. In the variable mode, autofocusing is performed in correspondence to an output of the AF sensor 57 except measurement periods. In the fixed mode, autofocusing is performed only at the first measurement. The measurement of the distance to the object is performed constantly by the AF sensor 57 in each of the modes. When the magnification power of the pickup is large, defocusing is liable to occur. Then, the variable mode is appropriate to get a clear distant image. Further, in the variable mode, the position of the object can be detected when it moves largely. On the other hand, driving control for the lens can be omitted in the fixed mode.

As explained above, distance measurement with a distance sensor is used besides distance measurement with light projection using an optical system for measurement. By using the optical system for measurement, the precision of the measurement is secured, while by using the distance sensor, continuous measurements are performed. The distance sensor can measure the distance in a wider range than the measurement with light projection. By selecting a projection direction with reference to the measured value by the distance sensor, the distance measurement with the optical system for measurement can be performed efficiently.

TABLE 2

| Items | Contents of control signals |
| --- | --- |
| | Contents |
| RUN | Completion of pickup preparation |
| SStart | Command for execution of measurement |
| GCALC | Center of gravity operation |
| NextI | Start of output of latest image |
| VSync | Frame synchronization signal of image output |
| Frame counter | Counter of VSync signals |
| OPR | Output period of distance image (Frame number) |

Figure 9:
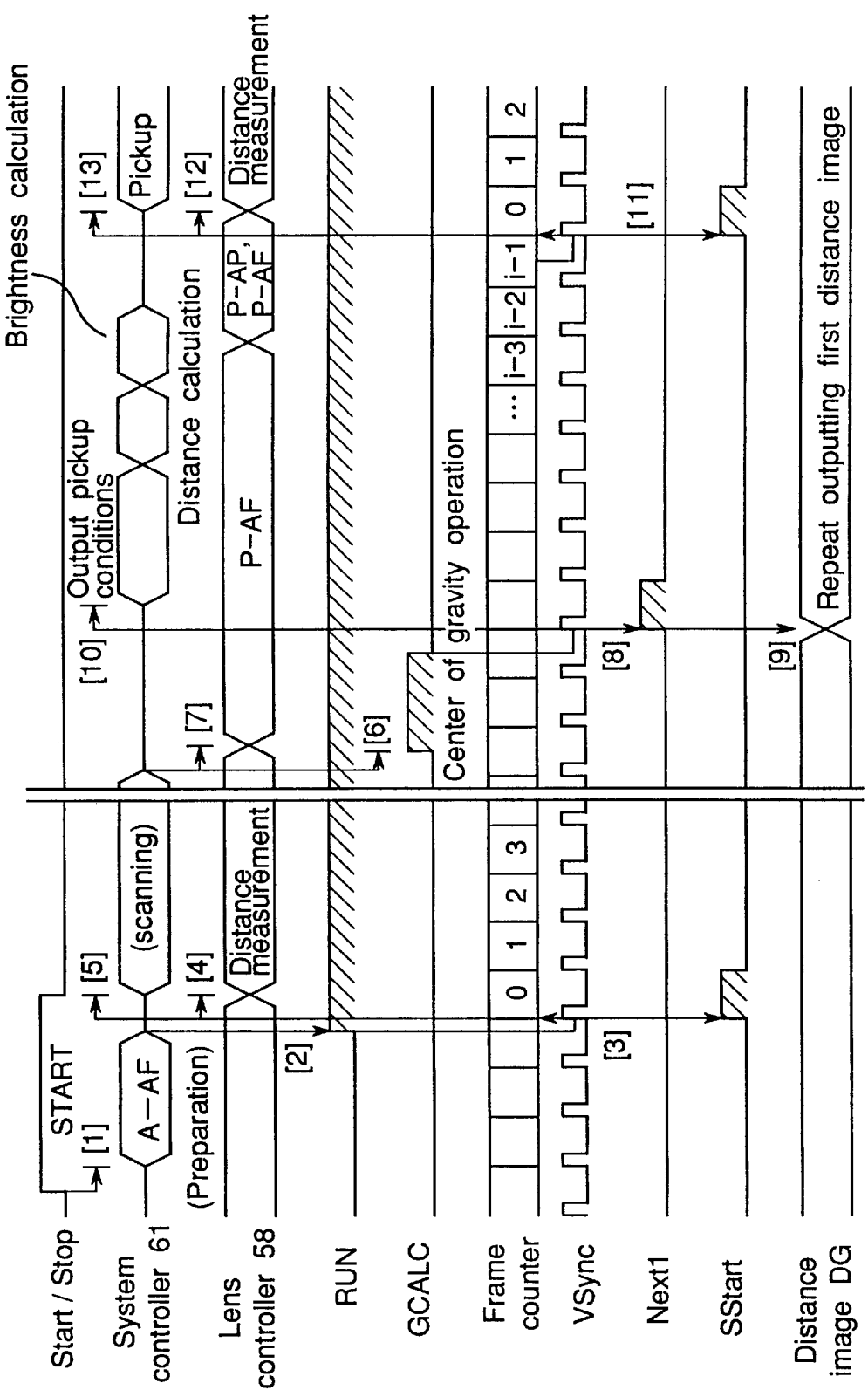
FIG. 9 is a time chart of the three dimensional camera in continuous mode.
Figure 10:
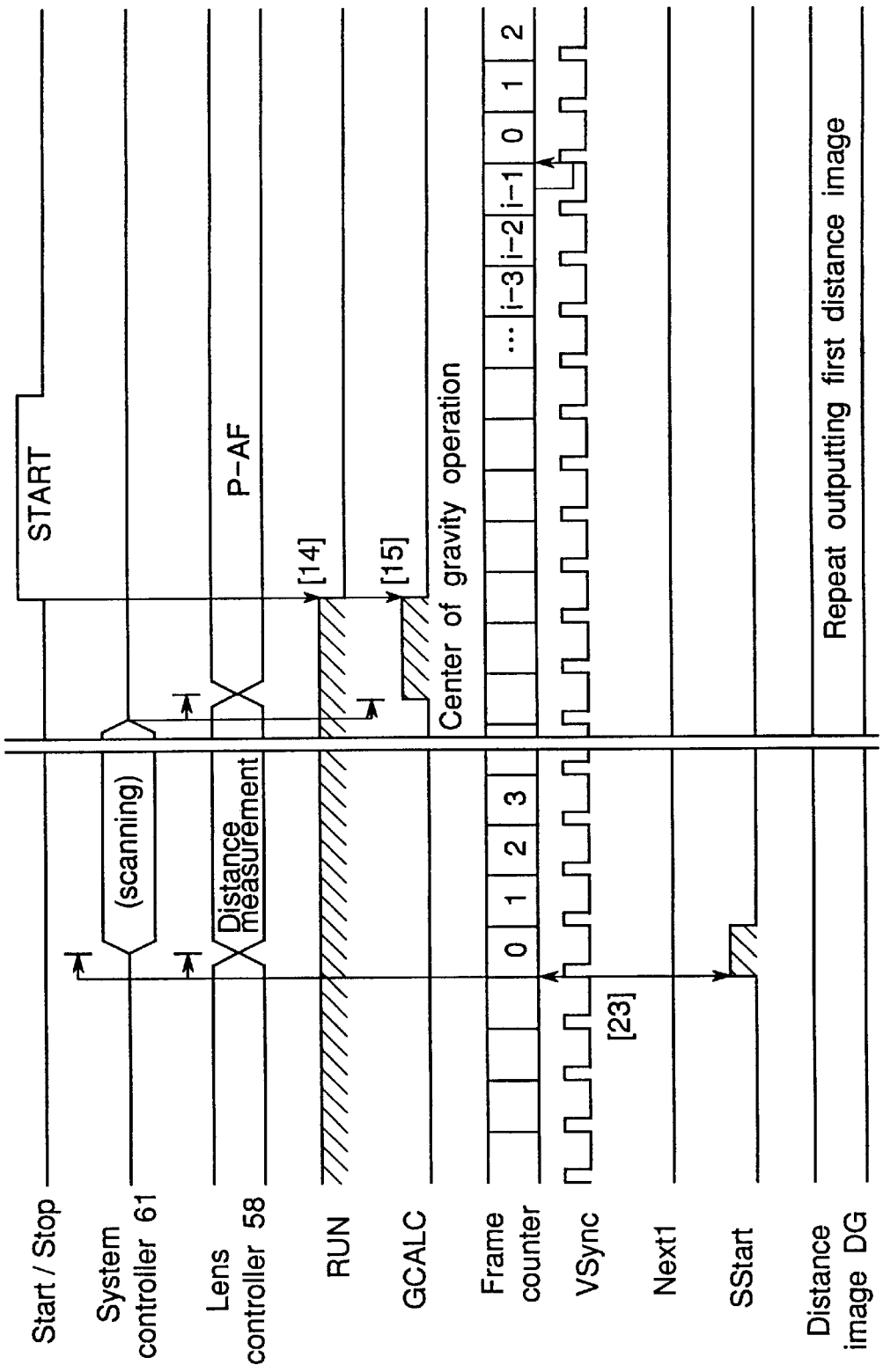
FIG. 10 is another time chart of the three dimensional camera in continuous mode.

FIGS. 9 and 10 are time charts of the three dimensional camera 2 in a continuous mode. Table 2 shows the contents of control signals. In Table 2, RUN, SStart, GCALC and NextI represent bits in the control register R1, and OPI is shown as "i" in FIGS. 9 and 10.

The operation of the system controller 61 is explained here. At point [1], pickup preparation (preprocessing) is started, in correspondence to pressing the start/stop button 27 or an input of start command by the host computer 3. In the preparation, the distance d to the object 4 is determined with the above-mentioned light projection, and various settings such as active autofocusing (A-AF), projection angle and laser intensity are performed.

At point [2], or when the pickup preparation is completed, RUN bit in the control register R1 is set at 1. Then, it is waited that SStart bit becomes 1.

At point [3] or at the first VSync signal after the RUN bit becomes 1, SStart bit is set at 1, and the frame counter is reset. The SStart bit is reset at 0 at the next VSync signal.

At points [4] and [5], or when SStart bit becomes 1, the movement of the lens is inhibited to keep pickup conditions fixed, and the scanning (pickup) of the object is started with the slit light "U". In a period of about 0.8 second thereafter, the system controller 61 only controls the scanning, and the lens controller 68 measures the distance with the AF sensor 57. In the measurement, the distance to the object at the start of the next scanning can be predicted according to the change in the distance to the object.

At points [6] and [7], or when the scanning is completed, GCALC bit in the control register R1 is set at 1. Then, the center-of-gravity operator 64 starts to calculate the center-of-gravity of time $N_{peak}$. The GCALC bit is reset at 0 when the distance image DG is generated completely.

The movement of the lens is allowed for the lens controller 58. Then, the lens controller 58 starts passive autofocusing (P-AF) to measure the distance to the object with the AF sensor 57.

At points [8] and [9], or at the first VSync signal after the GCALC bit reset at 0, NextI bit is set at 1, and the frame memory is changed to start the output of the latest distance image. Then, the distance image DG of the same content is output repeatedly until a new distance image is generated. The NextI bit is reset at 0 at the first VSync signal after NextI bit is set at 1.

Then, at point [10], pickup conditions and apparatus information are sent from a port (the digital output terminal 33) different from the port for the distance image DG to the host computer 3. Thus, the host computer 3 recognizes that the latest distance image DG is output. After the data output is completed, distance conditions and exposure conditions are calculated for a next pickup based on the present pickup, and it is waited that SStart bit becomes 1. At this stage, if the variable mode is set, a change in the distance to the object is detected according to the output of the passive autofocusing. If the change exceeds a threshold, the distance is measured precisely with light projection, and focusing and pickup conditions are calculated.

At point [11], or when the count of the frame counter becomes a value smaller by one than the predetermined value (OPR), the count is reset at the next VSync signal, and the SStart bit is set at 1. Then, the SStart bit is reset at 0 at the next VSync signal. The value OPR is set manually with the host computer 3. That is, a user can set a desired measurement period.

At points [12] and [13], or when the SStart bit becomes 1, the movement of the lens is inhibited to keep pickup conditions fixed, as at points [4] and [5], to start scanning (pickup). Thereafter, operations between [6]–[11] are performed, and measurement between points [3]–[11] are repeated each time the SStart bit becomes 1. However, the output of the apparatus information is omitted at the second measurement after the start instruction and thereafter.

As shown in FIG. 10, at points [14] and [15], or when the start/stop button 27 is pressed again or a stop command is received from the host computer 3, the RUN bit is reset at 0. If the stop command is received during the center-of-gravity operation, the GCALC bit is reset at 0 at the time. The output of the latest distance image is repeated when the stop command is issued at any time.

Figure 11:
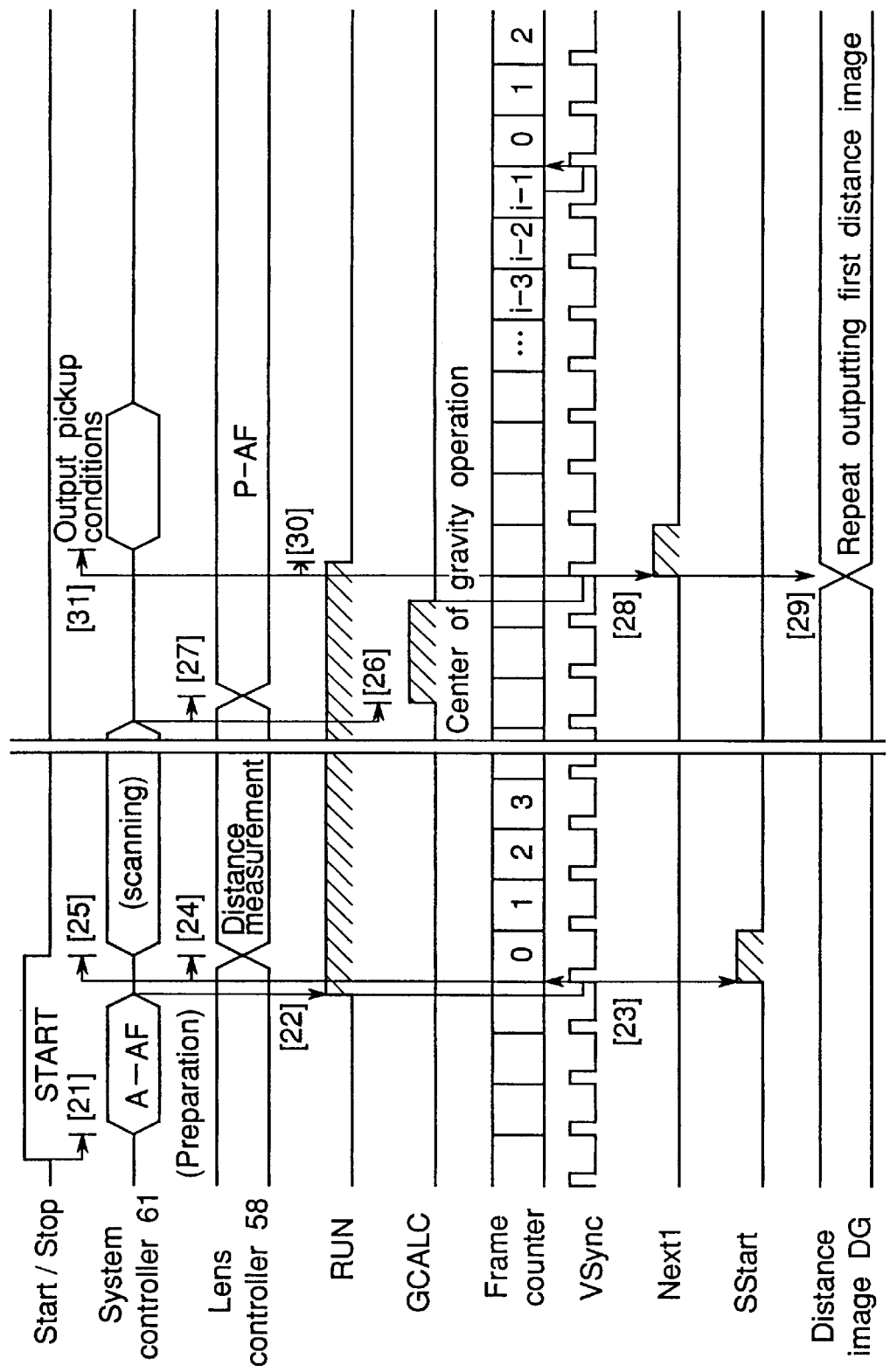
FIG. 11 is a time chart of the three dimensional camera in one shot mode.

FIG. 11 is a time chart of the three dimensional camera 2 in the one shot mode. At points [21]–[29], similar operation to the points [1]–[9] in the above-mentioned continuous mode is performed.

At point [30], the RUN bit is reset at 0 when the NextI bit becomes 1.

At point [31], pickup conditions and apparatus information are output through the digital output terminal 33 to the host computer 3. Thereafter, a start command is set, and the output of the latest distance image is repeated until a new distance image is generated.

Figure 12:
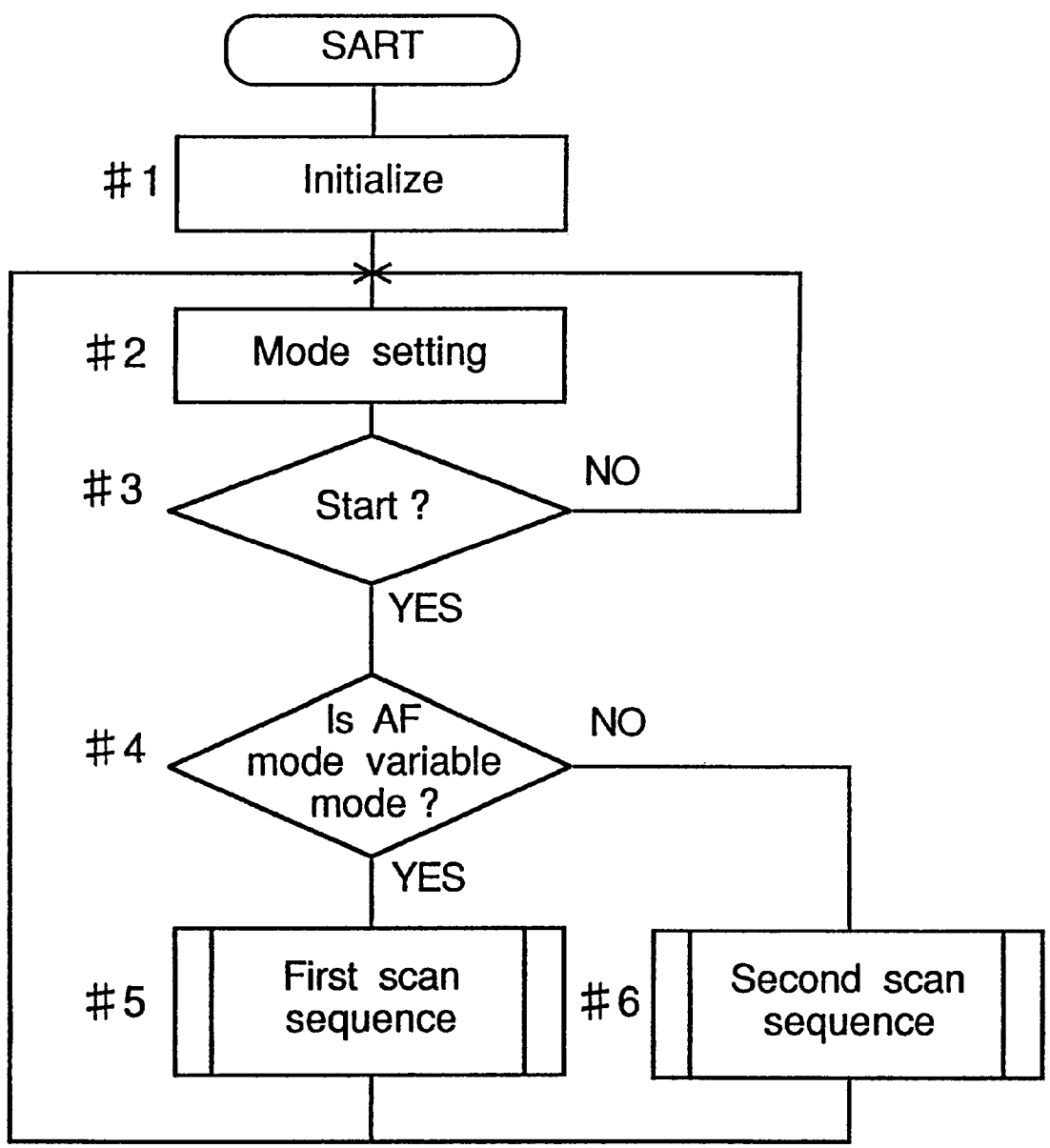
FIG. 12 is a main flowchart of a system controller of the three dimensional camera.

FIG. 12 is a main flowchart of the system controller 61 of the three dimensional camera 2. When the power supply is turned on, control parameters including bits in the control register R1 are set for initialization (step #1). Then, the mode is set according to the button operation or a command from the host computer 3 (step #2). Thus, a user can set the measurement period in the continuous more in the unit of frame.

Figure 13A:
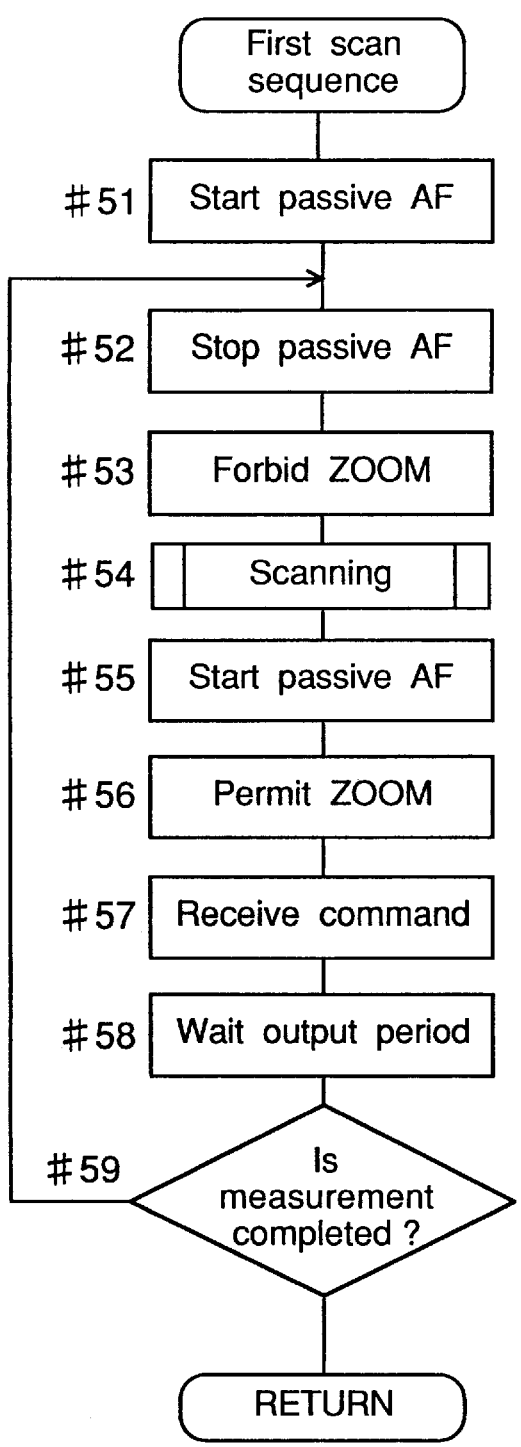
FIG. 13A is a flowchart of first scan sequence.

When a start command is received, measurement is started (step #3). If the mode is variable mode, the first scan sequence is performed (steps #4 and #5), while if it is fixed mode, the second scan sequence is performed (step #6). FIG. 13A is a flowchart of the first scan sequence (FIG. 12, step #5), and FIG. 13B is a flowchart of the second scan sequence.

In the first scan sequence, shown in FIG. 13A, passive autofocusing is started first, and the position of the focusing lens is controlled according to the relative movement of the object to the three dimensional camera 2 (step #51). When a start command is received, passive autofocusing is stopped to prevent movement of the lens during scanning (step #52), and zooming is inhibited (step #53).

Then, scanning for obtaining a distance image DG is performed (step #54). After the scanning is completed, passive autofocusing is started again (step #55), and inhibition of zooming is canceled (step #56). Commands and operations are accepted (step #57), and it is waited that the count of frame synchronization signals VSync attains a predetermined value (step #58). Then, it is decided if the measurement is completed or not (step #59). In the one shot mode, or when a stop command is received in the continuous mode, the flow returns to the main routine. If a stop command is not received in the continuous mode, the flow returns to step #52 to repeat measurement.

Figure 13B:
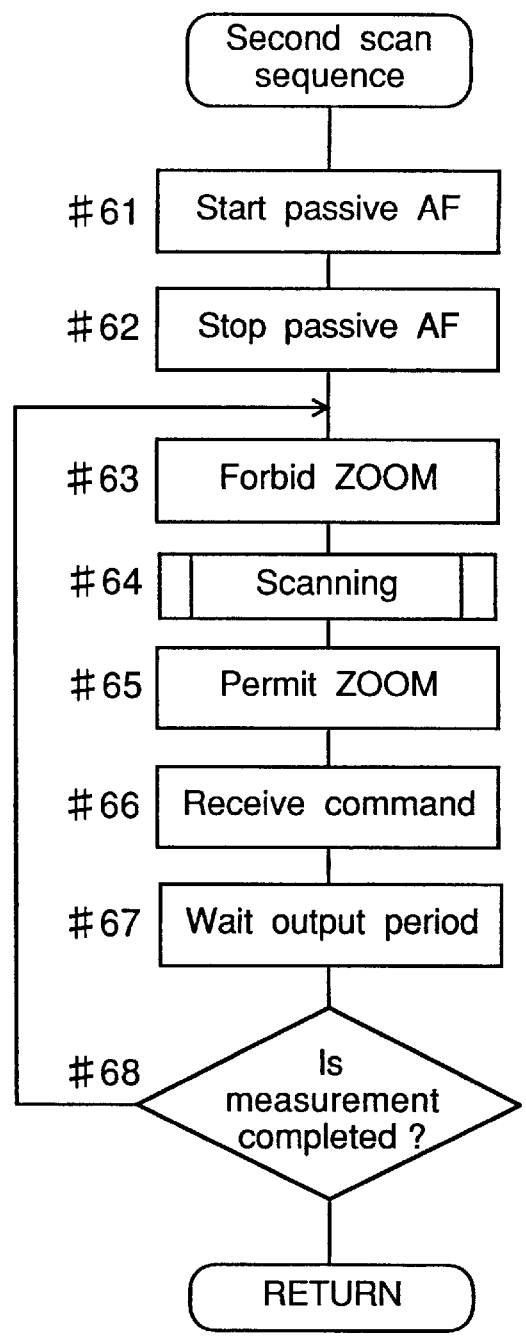
FIG. 13B is a flowchart of second scan sequence.

In the second scan sequence (FIG. 12, step #6), shown in FIG. 13B, passive autofocusing is started first (step #61). When a start command is received, passive autofocusing is stopped to prevent movement of the lens during scanning (step #62), and zooming is inhibited (step #63). Then, scanning for obtaining a distance image DG is performed (step #64). After the scanning is completed, inhibition of zooming is canceled (step #65), but passive autofocusing is not started again. Commands and operations are accepted (step #66), and it is waited that the count of frame synchronization signals VSync attains a predetermined value (step #67). Then, it is decided if the measurement is completed or not (step #68). In the one shot mode, or when a stop command is received in the continuous mode, the flow returns to the main routine. If a stop command is not received in the continuous mode, the flow returns to step #63 to repeat measurement.

Figure 14:
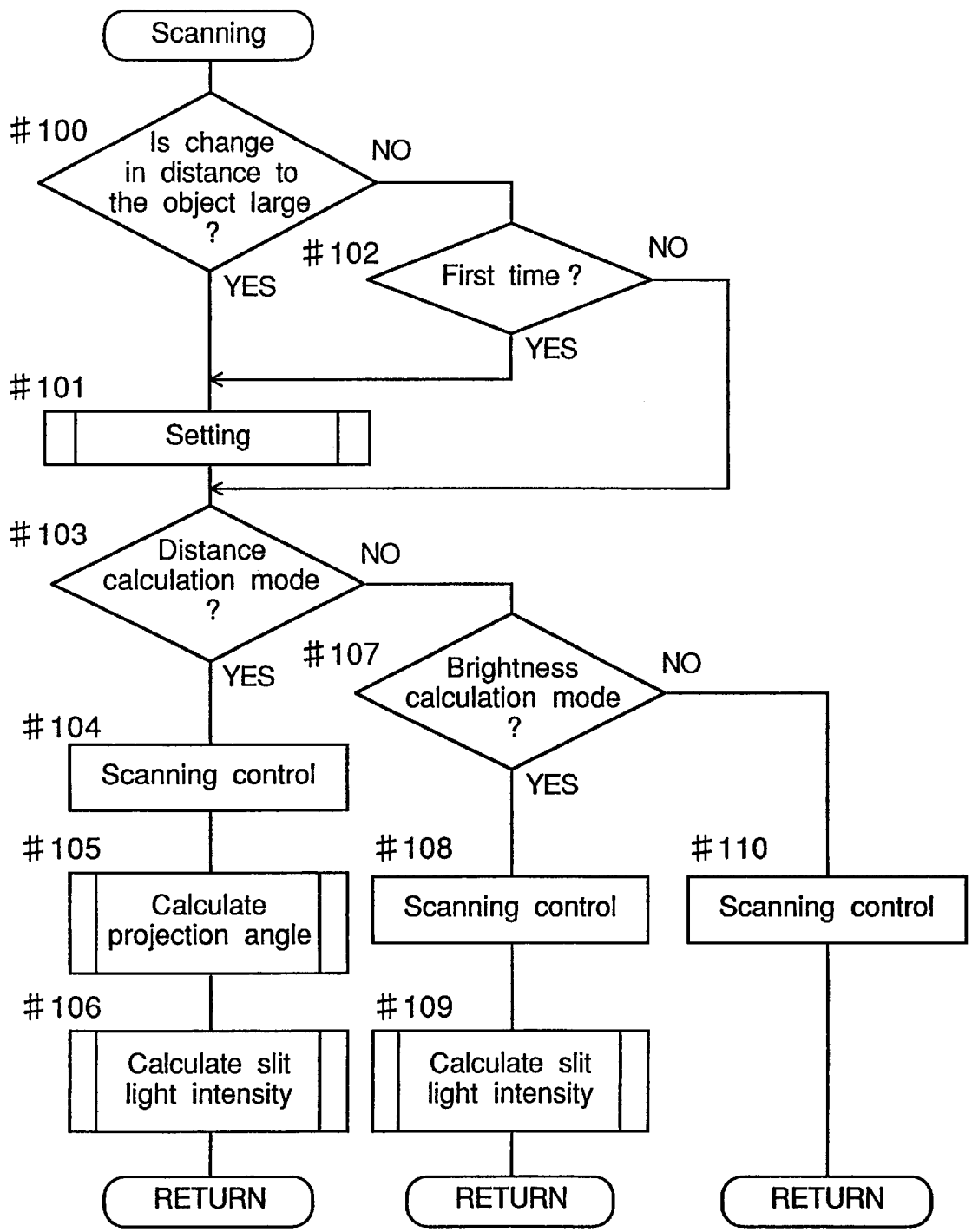
FIG. 14 is a flowchart of scanning.

FIG. 14 is a flowchart of scanning (FIG. 13A, step #54 and FIG. 13B, step #64). As explained above, the distance to an object 4 to be measured is measured always with the sensor 57. A change in the distance is checked, and if the change exceeds a threshold (YES at step #100), setting is performed to determine pickup conditions by determining the distance to the object with slit light projection (step #101). Even if the change does not exceed a threshold (NO at step #100), if the measurement is the first measurement performed after a start command (YES at step #102), the scanning is performed. In other words, in the measurements after the first measurement, the setting is omitted if the change in distance is not large. Thus, the precision of the three dimensional measurement is assured, and the load of the measurement control is decreased.

If distance calculation mode is set as a setting mode for pickup conditions in the continuous mode (YES at step #103), scanning control is performed to obtain a distance image in the pickup conditions set at the time (sep #104), and projection angle and slit light intensity are calculated based on the pickup information to be provided for calculating pickup conditions in the next measurement (steps #105 and 106).

If brightness calculation mode is set as a setting mode for pickup conditions in the continuous mode (YES at step #107), scanning control is performed to obtain a distance image in the pickup conditions set at the time (sep #108), and slit light intensity is calculated based on the pickup information to be provided for calculating pickup conditions in the next measurement (steps #109).

If neither of distance calculation mode or brightness calculation mode is set as a setting mode for pickup conditions in the continuous mode (No at step #107), only the scanning control is performed (step #110).

In this embodiment, the pickup information obtained in each measurement is used for setting light-receiving conditions for a next measurement. In other words, each measurement is also used as a preliminary measurement for a next measurement. Then, a preliminary active distance measurement is not needed between measurements. If this scanning is compared with a prior art where pickup conditions are measured for each measurement by using preliminary measurement, the measurement period can be decreased by a time needed for the preliminary measurement because pickup conditions in the next measurement are calculated based on the pickup information just before the measurement. Because the optical system for measurement is used as the preliminary measurement, the distance can be measured precisely. Further, because measurement information in a number of projection angles is obtained, detailed information can be obtained on the space to be scanned in the measurement, and pickup conditions can be calculated more precisely by using the measurement information in each time as preliminary measurement information for the next information than the preliminary measurement which uses projection of the slit light in one direction.

Figure 15:
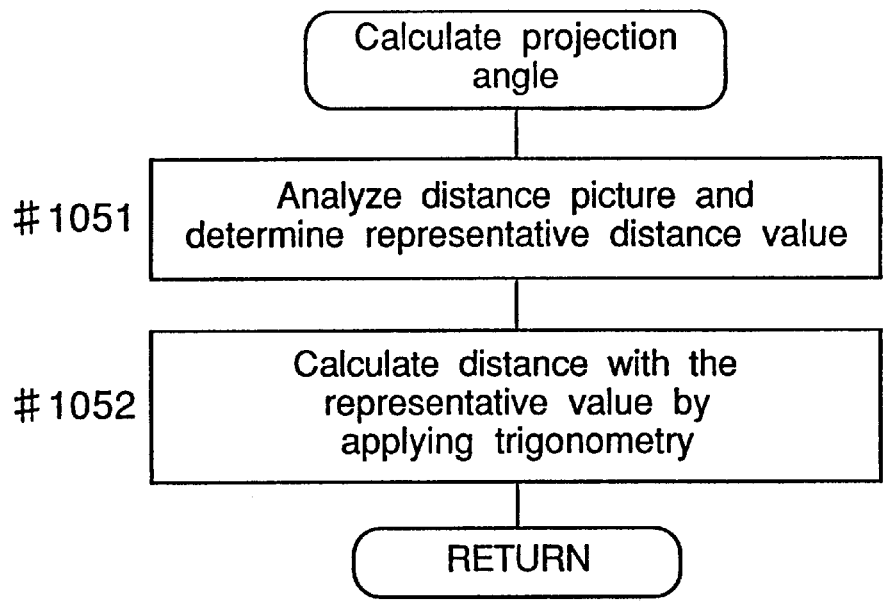
FIG. 15 is a flowchart of calculation of projection angle.

FIG. 15 is a flowchart of calculation of projection angle (FIG. 14, step #105). First, the distance image is analyzed, and a representative value of the distance to the object is determined (step #1051). The representative value can be determined in various ways including three methods explained below. In the first method, pixels are sampled uniformly in the entire image, and the shortest distance is selected as the representative value. This can avoid an error that a distance to the background in the image is selected as the representative value. In the second method, a plurality of pixels aligned vertically and horizontally around the center of the image are sampled, and an average of an intermediate value of the distances is determined as the representative value. This is advantageous that the effect of noises is small. In the third method, the first and second methods are combined so as to sample a plurality of pixels aligned vertically and horizontally in each area obtained by dividing the image uniformly.

Next, an actual distance is calculated based on the apparatus conditions such as the representative value and the pixel pitch and the pickup conditions such as focal distance by applying trigonometry (step #1052). Then, start angle and stop angle of the projection in the scanning are set so that a predetermined area before and behind the position of the obtained distance is measured.

Figure 16:
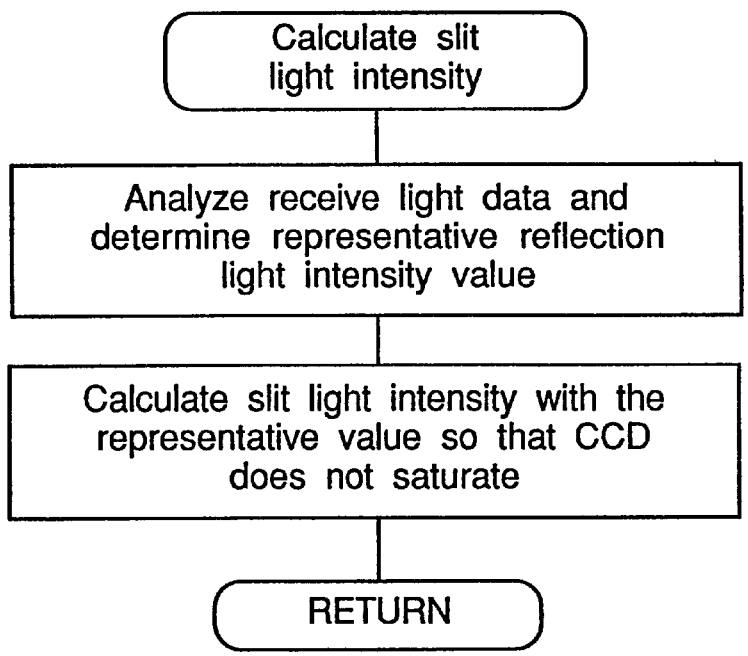
FIG. 16 is a flowchart of calculation of slit light intensity.

FIG. 16 is a flowchart of calculation of the slit light intensity (FIG. 14, steps #106 and #109). The light intensity (quantity of reflected light) data of the n-th field stored in the memory bank 63C in the memory 63 is sampled uniformly, and the largest value is set as a representative value (step #1061). If the largest sampled value is the upper limit value, or if the light intensity measured by the sensor 53 is saturated, the largest light intensity is measured by interpolation with light intensity data of the pixels under interest at the (n±1)-th fields, and the result is set as the representative value.

Next, the slit light intensity is adjusted according to the representative value so that the light intensity detected by the sensor 53 is most appropriate (step #1062). If necessary, the exposure time of the sensor is also adjusted to make the light intensity detected by the sensor 53 most appropriate. As explained above, the light-receiving conditions are adjusted according to the pickup information obtained in a previous measurement. Thus, each measurement is also used as a preliminary measurement for the next measurement.

Figure 17:
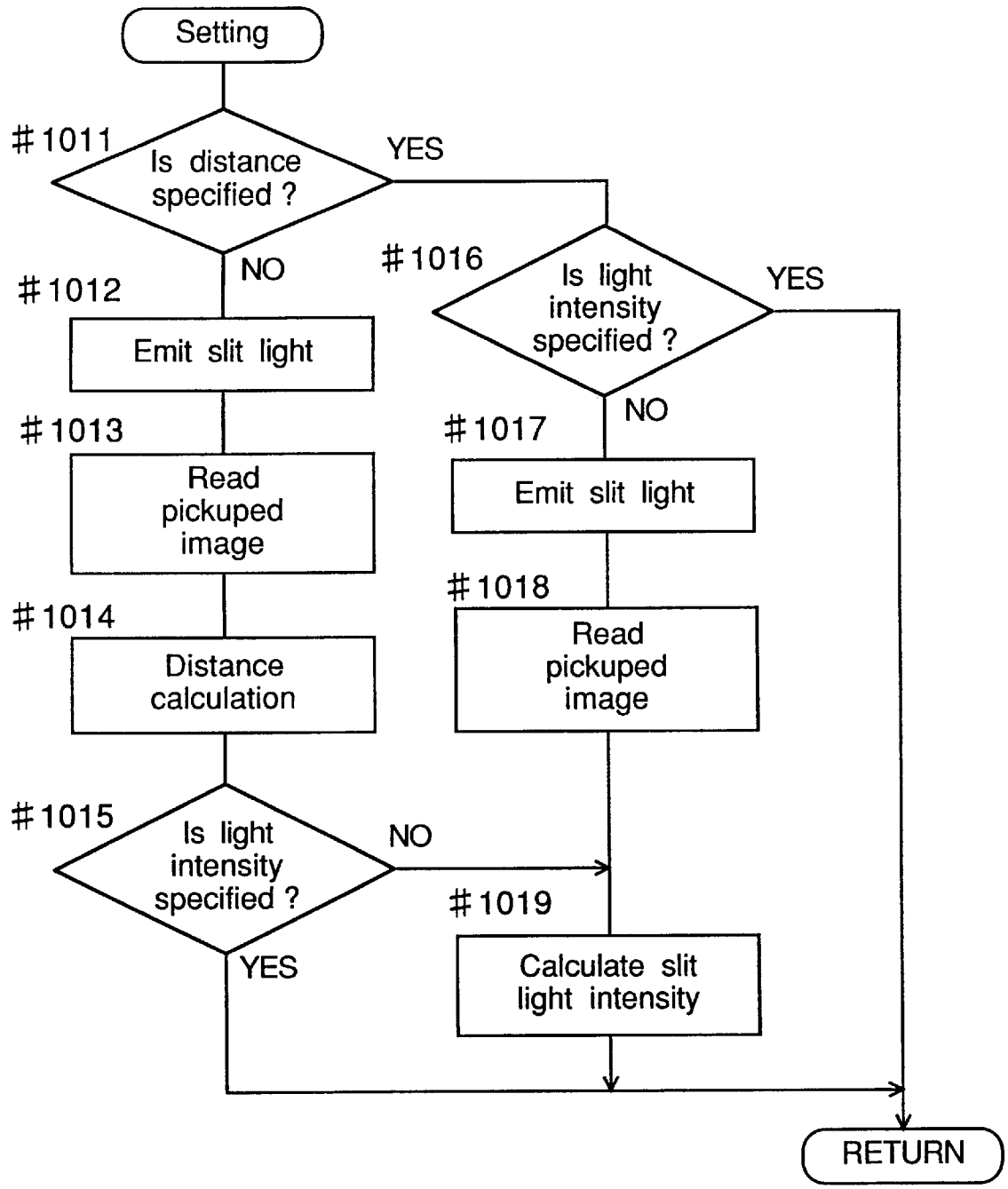
FIG. 17 is a flowchart of setting.

FIG. 17 is a flowchart of the setting (FIG. 14, step #101). If a pickup distance is not specified with manual operation or by a command (NO at step #1011), the slit light "U" is emitted (step #1012), and the pickuped image is read (step #1013), and the distance to the object is determined at IS based on the pickup information, and the start angle and stop angle of the projection in the scanning are set so that a ,predetermined area before and behind the position of the obtained distance is measured (step #1014). If the light intensity is not specified (NO at step #1015), the flow proceeds to step #1019.

If the pickup distance is specified but the light intensity is not specified (NO at step #1016), the slit light "U" is emitted (step #1017), and the pickup image is read (step #1018). Then, the intensity of the slight light "U" is adjusted according to the obtained pickup information so that the light intensity detected by the sensor 53 becomes most appropriate (step #1019).

Figure 18:
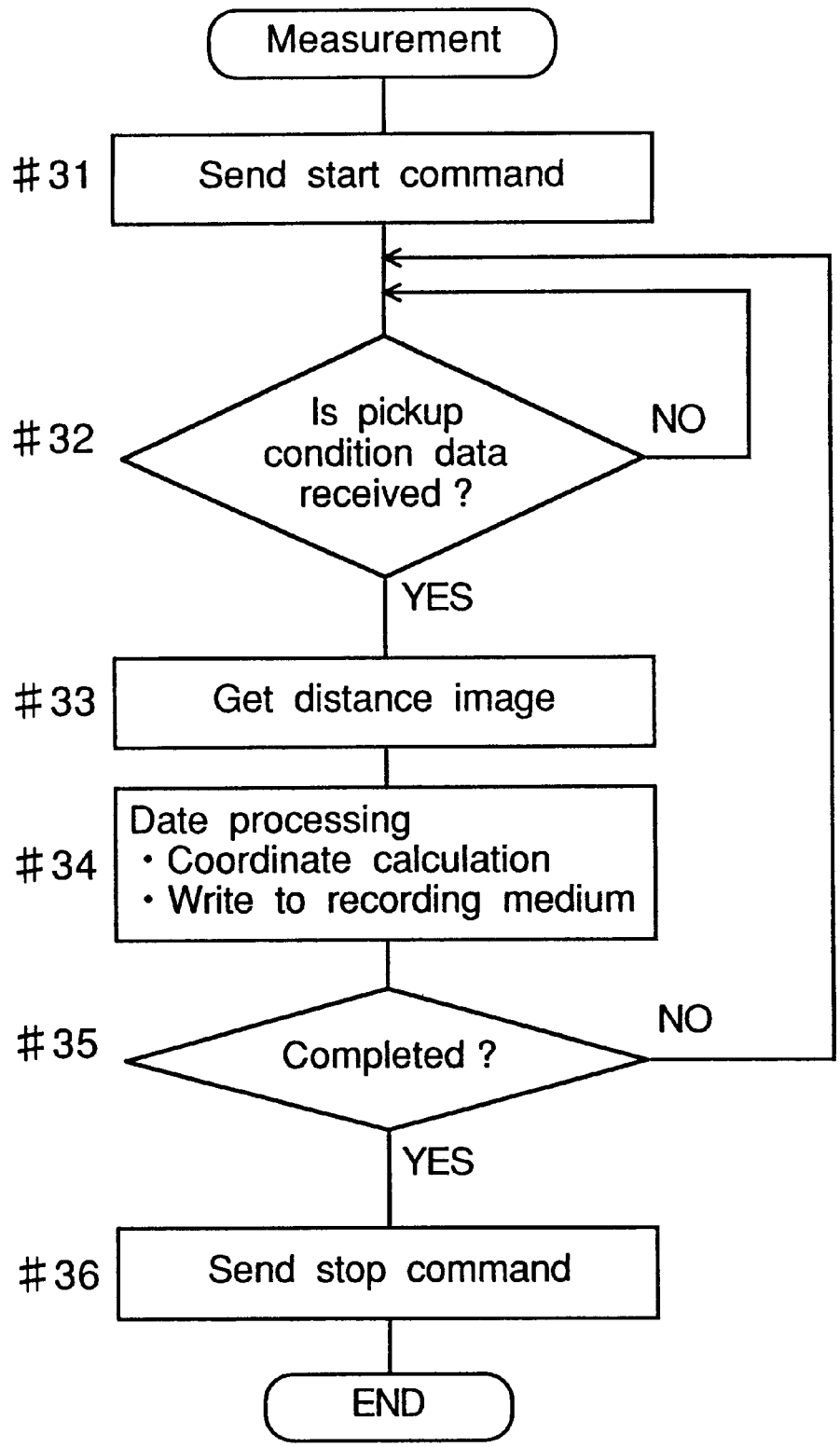
FIG. 18 is a flowchart of measurement of a host computer.

FIG. 18 is a flowchart of measurement performed by the host computer 3. First, a start command is sent to the three dimensional camera 2 (step #31), and pickup condition data DS is waited to be sent (step #32). The distance image DG is get as measurement information for a measurement in correspondence to the input of the pickup condition data DS (step #33). Then, the information processing is performed on the distance image (step #34). The information processing includes coordinate calculation based on the distance image DG and the pickup conditions and write of the distance image DG to a recording medium. The latest distance image DG is get repeatedly in correspondence to the input of the pickup conditions data DS until predetermined stop conditions (time and a number) are satisfied (step #35).

When the predetermined stop conditions are satisfied, a stop command is sent to the three dimensional camera 2 (step #36), and the measurement is completed. A user may monitor the measurement situation by displaying the distance image on the display 3b of the host computer 3. It is also possible to display two-dimensional pickup image beside the distance image DG.

In the above-mentioned embodiment, the pickup condition data DS are used as a control signal for getting the distance image DG. If the measurement period does not agree with the frame period of the image signal format, it is necessary to send a signal for receiving measurement information besides the frame synchronization signals. Because digital signals on measurement conditions or the pickup condition data DS are used as the signal, it is not necessary for providing a special signal for getting the distance image. A user can change the measurement period in the continuous mode in the unit of frame.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A three dimensional pickup apparatus which picks up an object to generate image information including a shape of the object, said apparatus comprising:

a pick-up device which picks up an object;

a condition setter for setting pickup conditions of the pick-up device;

an imaging controller for performing pickup operation repeatedly in correspondence to a start signal;

wherein said condition setter sets the pickup conditions in a first mode before each pidkup operation so that each pickup operation is performed in pickup conditions updated before the pickup operation and said condition setter sets the pickup conditions in a second mode once so that each pickup operation is performed in the same pickup conditions.

2. The three dimensional pickup apparatus according to claim 1, wherein said condition setter sets the pickup conditions according to a position of the object relative to said three dimensional pickup apparatus.

3. The three dimensional pickup apparatus according to claim 2, wherein said pick-up device comprises a projection unit which projects a slit light to an object while changing a projection angle of the slit light and a light-receiving unit which receives a light reflected by the object, and said condition setter sets an intensity of the projection light as one of the pickup conditions.

4. The three dimensional pickup apparatus according to claim 1, wherein said pick-up device comprises a projection unit which projects a slit light to an object while changing a projection angle of the slit light and a light-receiving unit which receives a light reflected by the object, and said condition setter sets a range of the projection angle of said projection unit as one of the pickup conditions.

5. A three dimensional pickup apparatus which picks up an object to generate image information including a shape of the object, said apparatus comprising:

a pick-up device which picks up an object;

a condition setter for setting pickup conditions of the pick-up device; and a pickup controller for performing pickup operation repeatedly in correspondence to a start signal;

wherein said condition setter sets the pickup conditions before each pickup operation so that each pickup operation is performed in pickup conditions updated before the pickup operation.

6. The three dimensional pickup apparatus according to claim 5, wherein said condition setter sets the pickup conditions according to a position of the object relative to said three dimensional pickup apparatus.

7. The three dimensional pickup apparatus according to claim 5, wherein said pick-up device comprises a projection unit which projects a slit light to the object while changing a projection angle of the slit light and a light-receiving unit which receives a light reflected by the object, and said condition setter sets a range of the projection angle of said projection unit as one of the pickup conditions.

8. The three dimensional pickup apparatus according to claim 5, wherein said pick-up device comprises a projection unit which projects a slit light to the object while changing a projection angle of the slit light and a light-receiving unit which receives a light reflected by the object, and said condition setter sets an intensity of the projection light as one of the pickup conditions.

9. A three dimensional pickup apparatus which picks up an object to generate image information including a shape of the object, said apparatus comprising:

a pick-up device which picks up an object;

a condition setter for setting pickup conditions of the pick-up device;

an imaging controller for performing pickup operation repeatedly in correspondence to a start signal;

wherein said condition setter sets the pickup conditions once so that each pickup operation is performed in the same pickup conditions thereafter.

10. The three dimensional pickup apparatus according to claim 9, wherein said condition setter sets the pickup conditions according to a position of the object relative to said three dimensional pickup apparatus.

11. The three dimensional pickup apparatus according to claim 9, wherein said pick-up device comprises a projection unit which projects a slit light to an object while changing a projection angle of the slit light and a light-receiving unit which receives a light reflected by the object, and said condition setter sets a range of the projection angle of said projection unit as one of the pickup conditions.

12. The three dimensional pickup apparatus according to claim 9, wherein said pick-up device comprises a projection unit which projects a slit light to an object while changing a projection angle of the slit light and a light-receiving unit which receives a light reflected by the object, and said condition setter sets an intensity of the projection light as one of the pickup conditions.

* * * * *

UNITED STATES PATENT AND TRADEMARK OFFICE
CERTIFICATE OF CORRECTION

PATENT NO. : 6,049,385
DATED : April 11, 2000
INVENTOR(S) : Toshio Norita, et al.

It is certified that error appears in the above-identified patent and that said Letters Patent is hereby corrected as shown below:

<u>Title page,</u>
Section [75], change Hiroshi Uchino's residence from "Otokuni-Gun" to -- Kyoto --.
Change Takuto Joko's residence from "Nacaokakyo" to -- Kyoto --.
Change Eiichi Ide's residence from "Itami" to -- Hyogo-Ken --.

Section [56], References Cited, under Foreign Patent Documents, add:
7-174538        7/1995        Japan.

<u>Column 16, claim 1,</u>
Line 4, change "an imaging controller" to -- a pickup controller --.

Signed and Sealed this

Ninth Day of October, 2001

Attest:

NICHOLAS P. GODICI
Attesting Officer
Acting Director of the United States Patent and Trademark Office